(12) United States Patent
Juang et al.

(10) Patent No.: US 9,042,888 B2
(45) Date of Patent: May 26, 2015

(54) MOBILE DEVICE NETWORK SIGNALING MANAGEMENT

(75) Inventors: Ben-Heng Juang, Milpitas, CA (US); Ravi Ayyappan, Santa Clara, CA (US); Shiehlie Wang, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 217 days.

(21) Appl. No.: 13/311,444

(22) Filed: Dec. 5, 2011

(65) Prior Publication Data

US 2013/0143615 A1 Jun. 6, 2013

(51) Int. Cl.
*H04W 24/00* (2009.01)
*H04W 4/00* (2009.01)
*H04W 36/00* (2009.01)
(Continued)

(52) U.S. Cl.
CPC .............. *H04W 48/08* (2013.01); *H04W 48/18* (2013.01)

(58) Field of Classification Search
CPC ....... H04W 8/26; H04W 8/183; H04W 36/30; H04W 36/32; H04W 48/18; H04W 48/16; H04W 60/00; H04W 60/04; H04W 12/04; H04W 24/00; H04W 24/04; H04W 24/08; H04W 36/08; H04W 36/18; H04W 36/0055; H04W 52/02; H04W 52/40; H04W 68/04; H04W 68/06; H04W 76/02; H04W 76/028; H04W 84/045; H04W 88/06; H04W 88/08; G11C 16/0483; G11C 16/3418; G11C 16/3427
USPC ............. 455/423, 432.1, 432.2, 432.3, 435.2, 455/436, 437, 438, 522, 525, 414.1, 422.1, 455/433, 434, 435.3, 440, 445, 449, 450, 455/456.4, 552.1; 370/312, 318, 319, 320, 370/331, 252, 254, 329, 333, 335; 375/140, 375/148, 190, 260, 340; 365/185.18, 365/185.22, 185.24
See application file for complete search history.

(56) References Cited

U.S. PATENT DOCUMENTS 6,161,015 A * 12/2000 Birchler et al. ............... 455/440
8,355,730 B2 * 1/2013 Nakata .......................... 455/445
(Continued)

FOREIGN PATENT DOCUMENTS

WO WO 2009/052686 4/2009

OTHER PUBLICATIONS

International Search Report and Written Opinion for International Patent Application No. PCT/US2012/058592, dated Feb. 8, 2013.

*Primary Examiner* — Yuwen Pan
*Assistant Examiner* — Paul P Tran
(74) *Attorney, Agent, or Firm* — Downey Brand LLP

(57) ABSTRACT

A mobile wireless device maintains a radio sector database. When receiving no response or a negative response from a radio sector to a transmitted signaling message, the mobile wireless device adds or updates the radio sector database. When receiving a positive response from the radio sector, the mobile wireless device deletes the radio sector from the radio sector database. Before transmitting signaling messages to a radio sector, the mobile device determines a time delay value if the radio sector is in the radio sector database. The mobile wireless device discards the signaling message when an elapsed time since a most recently transmitted signaling message to the radio sector does not exceed the determined time delay value. In an embodiment, each radio sector in the radio sector database includes a failure count value, and the determined time delay value depends on the failure count value.

25 Claims, 20 Drawing Sheets

1400

| Index | LAI | Counter | RSCP | EcNo |
|---|---|---|---|---|
| 1 | Radio Sector 1 | Cnt 1 | RSCP 1 | EcNo 1 |
| 2 | Radio Sector 2 | Cnt 2 | RSCP 2 | EcNo 2 |
| 3 | Radio Sector 3 | Cnt 3 | RSCP 3 | EcNo 3 |
| 4 | Radio Sector 4 | Cnt 4 | RSCP 4 | EcNo 4 |
| 5 | Radio Sector 5 | Cnt 5 | RSCP 5 | EcNo 5 |

1410

| Index | Threshold | Delay T |
|---|---|---|
| 1 | N | T |
| 2 | 2N | 2T |
| 3 | 3N | 4T |
| 4 | 4N | 8T |
| 5 | 5N | 16T |

(51) Int. Cl.
*H04H 20/71* (2008.01)
*H04K 1/10* (2006.01)
*H04L 27/28* (2006.01)
*H04W 48/08* (2009.01)
*H04W 48/18* (2009.01)

(56) References Cited

U.S. PATENT DOCUMENTS

| | | | |
|---|---|---|---|
| 2006/0104211 A1* | 5/2006 | Islam et al. | 370/252 |
| 2006/0246888 A1* | 11/2006 | Bender et al. | 455/423 |
| 2006/0251023 A1 | 11/2006 | Choi | |
| 2007/0037577 A1 | 2/2007 | Dalsgaard et al. | |
| 2007/0149235 A1* | 6/2007 | Chin et al. | 455/522 |
| 2008/0227453 A1* | 9/2008 | Somasundaram et al. | 455/436 |
| 2009/0075690 A1* | 3/2009 | Roberts et al. | 455/552.1 |
| 2009/0253432 A1* | 10/2009 | Willey et al. | 455/435.2 |
| 2009/0285166 A1 | 11/2009 | Huber et al. | |
| 2010/0029274 A1* | 2/2010 | Deshpande et al. | 455/435.3 |
| 2010/0029283 A1* | 2/2010 | Iwamura | 455/437 |
| 2010/0173653 A1 | 7/2010 | Catovic et al. | |
| 2010/0329218 A1 | 12/2010 | Hoshino | |
| 2011/0117916 A1* | 5/2011 | Dahlen | 455/436 |

* cited by examiner

500

MOBILE DEVICE NETWORK SIGNALING MANAGEMENT

TECHNICAL FIELD

The described embodiments generally relate to methods and apparatuses for managing network signaling for mobile wireless devices. More particularly, the present embodiments describe network signaling management for mobile wireless devices to minimize power consumption during congested or poor signal quality network conditions.

BACKGROUND

Wireless networks and mobile wireless devices continue to evolve as new communication technologies develop and standardize. Current mobile wireless devices can include support to connect to one or more wireless networks that can use different wireless communication technologies. A representative mobile wireless device can include support for one or more releases of the Third Generation Partnership Project (3GPP) Global System for Mobile Communications (GSM), Universal Mobile Telecommunications System (UMTS), and/or Long Term Evolution (LTE) wireless communication standards and/or one or more releases of the Third Generation Partnership Project 2 (3GPP2) CDMA2000 1x (also referred to as 1xRTT or 1x) wireless communication standard. A representative wireless network can support connections to different mobile wireless devices that each can use one or more different wireless communication standards.

A mobile wireless device, upon power up initialization, can search for suitable radio sectors of one or more wireless networks that support compatible wireless communication standards with which the mobile wireless device can associate. The mobile wireless device can register with a located wireless network through one of the wireless network's radio sectors and can "camp" on the radio sector of the wireless network in an idle state. When in an idle state, no active signaling or data connections exist between the mobile wireless device and the wireless network; thus, the location of the mobile wireless device is provided to the wireless network through a periodic and/or random location update. In order to perform the initial registration of the mobile wireless device with the wireless network and also to communicate the location update to the wireless network, the mobile wireless device can send a signaling message to the wireless network to request that a signaling connection be established with the wireless network. The signaling connection can be used to transport one or more signaling messages between the mobile wireless device and the wireless network to complete the registration and/or the location update processes. Additionally, the mobile wireless device can seek to establish a signaling connection with the wireless network when there is a request for a circuit switched or packet switched connection.

During congested network conditions, the wireless network can reject the request from the mobile wireless device to establish the signaling connection, and the mobile wireless device can subsequently resend the request to establish the signaling connection, as without the signaling connection the information exchange required for the registration and/or location update can be unable to be completed. Each time the mobile wireless device receives a rejection from the wireless network, another signaling request can be sent. By repeatedly sending signaling connection requests to the wireless network, the mobile wireless device can drain its own limited battery resources. Similarly, when the mobile wireless device is located in an area of weak signal coverage, the mobile wireless device can receive no response from the wireless network to the request to establish the signaling connection, and again the mobile wireless device can repeatedly send the signaling request, thereby draining the battery more rapidly than desired. The mobile wireless device can also be configured to prefer connections to a wireless network that uses a later generation wireless communication protocol, such as to a 3G wireless network, over connections to an earlier generation wireless communication protocol, such as to a 2G wireless network. When rejected by or receiving no response from a more preferred 3G wireless network, the mobile wireless device can associate with a less preferred 2G wireless network and can attempt to switch back to the more preferred 3G wireless network. The mobile wireless device can repeatedly attempt to associate with the rejecting or non-responsive more preferred 3G wireless network rather than the less preferred 2G wireless network resulting in unnecessary battery drain. Thus, there exists a need for a method to manage network signaling between the mobile wireless device and the wireless network that minimizes power consumption during congested and/or poor signal quality conditions.

SUMMARY OF THE DESCRIBED EMBODIMENTS

In one embodiment, a method to conserve battery power by managing signaling connections between a mobile wireless device and a wireless network is described. The method includes at least the following steps. In a first step, the mobile wireless device maintains a radio sector database. Subsequently, the mobile wireless device receives a trigger to transmit a signaling message to a radio sector in the wireless network. When the radio sector is in the radio sector database, the mobile wireless device determines a time delay value for the radio sector and an elapsed time since a most recently transmitted signaling message. The mobile wireless device discards the signaling message when the elapsed time does not exceed the predetermined time delay value. When the radio sector is not in the radio sector database, the mobile wireless device transmits the signaling message to the radio sector in the wireless network. When receiving a negative response or receiving no response from the wireless network in response to the transmitted signaling message, the mobile wireless device adds the radio sector to the radio sector database. In an embodiment, each radio sector in the radio sector database includes a failure count value, and the determined time delay value depends on the failure count value for the radio sector.

In another embodiment, a mobile wireless device including a receiver and a configurable processor is described. The processor is configured to process higher layer signaling messages. The receiver is configured to transmit to and receive from the wireless network lower layer signaling messages based on the higher layer signaling messages. The processor is further configured to generate a request to establish a radio resource connection with the wireless network. The transceiver is further configured to determine whether to establish the requested radio resource connection based on a database of rejected radio sectors stored in the mobile wireless device. When the radio sector is in the database of rejected radio sectors, the transceiver is configured to determine a time delay value for the radio sector and to discard the request to establish the radio resource connection when an elapsed time since transmitting a most recent request to establish a radio resource connection with the wireless network is less than the determined time delay value for the radio sector. Otherwise, the transceiver is configured to transmit the request to establish the radio resource connection.

In a further embodiment, a mobile wireless device including a receiver and a configurable processor is described. The processor is configured to process higher layer signaling messages. The receiver is configured to transmit to and receive from the wireless network lower layer signaling messages based on the higher layer signaling messages. The processor is further configured to generate a request to establish a radio resource connection with the wireless network. The transceiver is further configured to determine whether to establish the requested radio resource connection based on a database of non-responsive radio sectors stored in the mobile wireless device. The transceiver is also configured to store at least one signal quality metric for each radio sector in the database of non-responsive radio sectors. When the radio sector is in the database of non-responsive radio sectors, the transceiver is configured to determine a time delay value for the radio sector and to discard the request to establish the radio resource connection when the current value for the at least one signal quality metric does not exceed the stored value for the at least one signal quality metric for the radio sector by at least a signal quality threshold value and an elapsed time since transmitting a most recent request to establish a radio resource connection with the wireless network is less than the determined time delay value for the radio sector. Otherwise, the transceiver is configured to transmit the request to establish the radio resource connection.

In yet a further embodiment, computer program product encoded in a non-transitory computer readable medium for managing signaling connections between a mobile wireless device and a plurality of wireless networks is described. The computer program product in the mobile wireless device includes the following computer program code. Computer program code for initializing a radio sector database and a delay database in the mobile wireless device. Computer program code for camping on or re-selecting to a radio sector in the wireless network. Computer program code for receiving a request to establish a signaling connection between the mobile wireless device and the wireless network. Computer program code for determining whether to establish the signaling connection with the radio sector based on radio sector properties of the radio sector stored in the radio sector database and in the delay database. Computer program code for discarding the request when determining not establish the signaling connection. Computer program code for transmitting the request to the radio sector when determining to establish the signaling connection. Computer program code for adding the radio sector the radio sector database and computer program code for updating radio sector properties of the radio sector stored in the radio sector database when receiving a rejection and when receiving no response from the wireless network in response to the transmitted request. Computer program code for clearing the radio sector in the radio sector database when receiving a setup message from the wireless network in response to the transmitted request.

BRIEF DESCRIPTION OF THE DRAWINGS

The described embodiments and the advantages thereof may best be understood by reference to the following description taken in conjunction with the accompanying drawings.

DETAILED DESCRIPTION OF SELECTED EMBODIMENTS

Figure 1A:
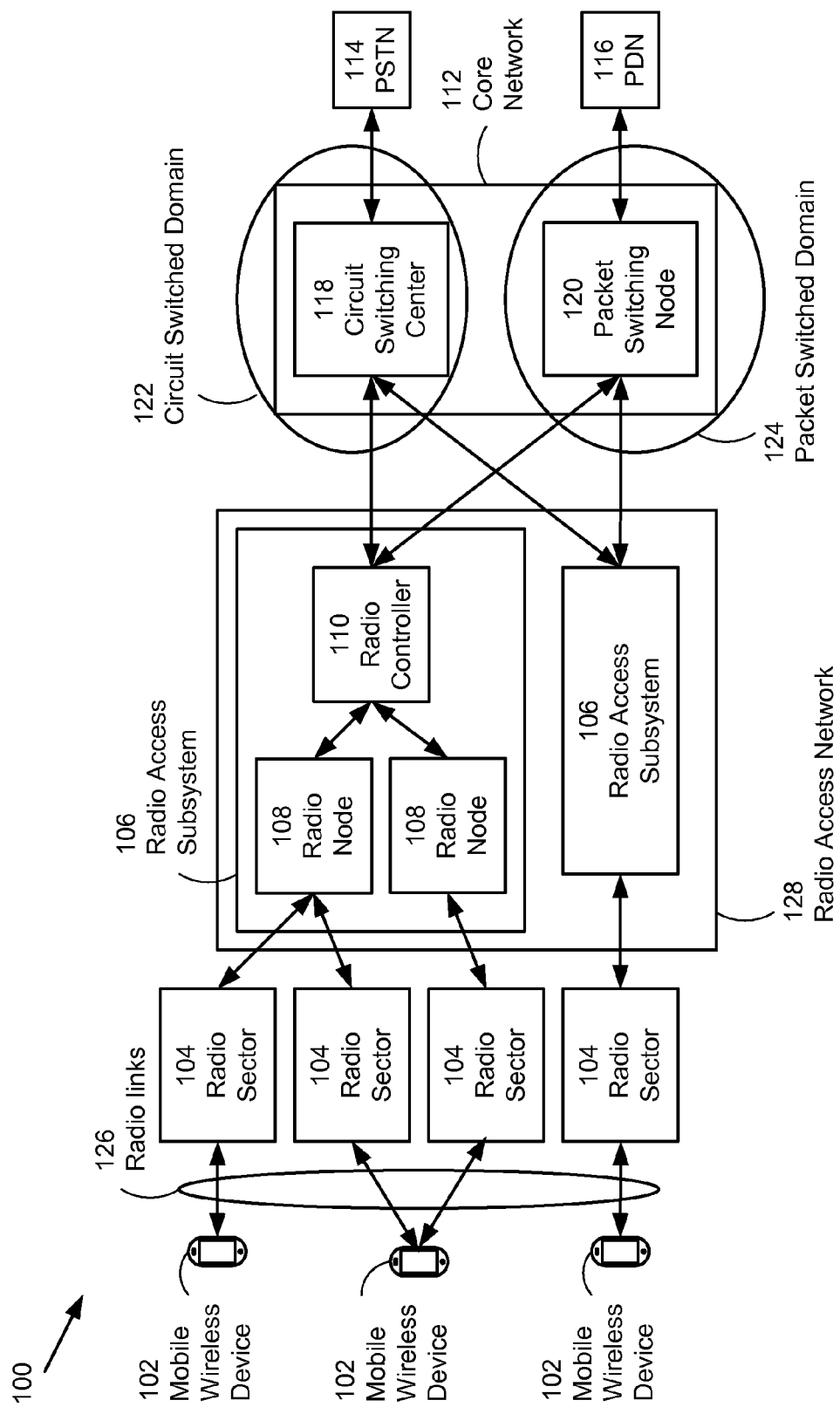
FIG. 1A illustrates components of a generic wireless communication network.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Each of the wireless communication standards can provide a set of services for the user of the mobile wireless device, with more recent generation standards typically supporting higher uplink and downlink transmission rates. The mobile wireless device can be configured to connect preferentially to a radio sector of a wireless network that supports a later generation standard over an earlier generation standard, e.g. LTE over UMTS over GSM.

The examples and embodiments provided below describe various methods and apparatuses for managing network signaling between a wireless mobile device and a wireless network, and in particular to network signaling management in a mobile wireless device to minimize power consumption during congested or poor signal quality network conditions. It should be understood that implementations of the methods and apparatuses can apply to mobile wireless devices used in a variety of wireless networks. For example, the same teachings can apply to a GSM network, a UMTS network, an LTE network, a CDMA2000 1x network or any combination of these networks that can be supported by the mobile wireless device. In general, the teachings described herein can apply to a mobile wireless device operating in a cellular wireless network based on radio access technology.

Wireless communication network deployments continue to evolve as wireless communication network technology advances and new or updated wireless communication protocols are standardized. Circuit switched networks continue to offer voice services while packet switched networks expand from data oriented services to include a multiplicity of services including video and packet voice. Wireless mobile devices also continue to increase in functionality to supplement voice connections with multimedia internet connectivity. A typical "smart phone" can include wireless circuitry that can communicate over several different types of wireless networks including short range wireless, e.g. Bluetooth, medium range wireless, e.g. WiFi, and long range wireless, e.g. GSM, UMTS, CDMA2000 and LTE. A mobile wireless device can be designed to a particular form factor, manufacturing cost point, and power consumption requirement based on a level of integrated circuitry available that can limit the total battery life available. A user of the mobile wireless device can prefer both the increased functionality offered by more recent generation wireless protocols (e.g. higher data transfer rates) and simultaneously require maximized battery life (i.e. minimized power consumption) from the mobile wireless device. Recognizing by the mobile wireless device network conditions that can result in frequently repeated transmissions, e.g. signaling requests to initiate connections, and adapting behavior in the mobile wireless device to minimize the required number of transmissions within a given time period can reduce power consumption and thereby extend battery life of the mobile wireless device.

Rapid battery drain can occur when the mobile device associates with the wireless network during a registration process as well as when the mobile wireless attempts to perform a location update with the wireless network. A radio sector in the wireless network with which the mobile wireless device can be associated can respond negatively or not respond to signaling messages from the mobile wireless device, such as requests to establish a signaling connection between the mobile wireless device and the wireless network. The signaling connection can needed for the mobile wireless device to communicate registration and/or location update information to the wireless network. When receiving a negative response from the wireless network, the mobile wireless device can be redirected to continue to use the same radio sector, with or without a wait time accompanying the negative response. The mobile wireless device can subsequently reattempt to establish the signaling connection by resending the signaling messages to the same negatively responding (or to a non-responsive radio sector) of the wireless network. This cycle of transmitting signaling messages and receiving a negative response or no response can repeat many times in a relatively short time interval and can lead to unnecessary battery drain in the mobile wireless device.

The mobile wireless device can be unaware of the reason for the negative response or lack of response from the wireless network. Under congested network conditions, the wireless network can be unable to grant the request for a signaling connection, and under poor radio frequency signal conditions, signaling messages to or from the wireless network can be lost or corrupted during transmission. The mobile wireless device, however, can continue to send signaling messages, e.g. to request to establish a connection, as the current radio sector can have a highest priority among radio sectors with which to associate and connect. Even when the mobile wireless device can "back down" to a radio sector that uses an earlier generation wireless communication protocol, such as to a radio sector in a 2G wireless network, the mobile wireless device can re-select to the radio sector in the 3G wireless network and re-attempt to exchange signaling messages with the 3G radio sector, as the 3G wireless network can be preferred over the 2G wireless network. Under adverse network conditions, prioritization of different wireless network can cause the mobile wireless device to "bounce" between multiple radio sectors of one or more wireless networks resulting in an undesirable battery drain.

To recognize network conditions, the mobile wireless device can maintain one or more databases containing information about connectivity behavior for radio sectors with which the mobile wireless device is presently associated and has been previously associated. In particular, the mobile wireless device can maintain a database of radio sectors to which one or more transmitted signaling messages have returned negative responses and/or from which no response has been received. For each radio sector in the database, the mobile wireless device can include information about the radio sector, such as a unique identifier, values for one or more signal quality indicators, and a failure count that can indicate a number of successive signaling message failures. In addition, the mobile wireless device can maintain a database that relates the failure count values to time delay values. Negatively responsive and non-responsive radio sectors can be added to the one or more databases, and positively responsive radio sectors can be deleted from the one or more databases. In an embodiment, a database of negatively responsive radio sectors can be separate from a database of non-responsive radio sectors. In another embodiment, both negatively responsive and non-responsive radio sectors can be in the same database. In an embodiment, each type of signal quality indicator can have associated a signal quality threshold value.

The mobile wireless device can be configured to ensure that the time between successively transmitted signaling messages to a particular radio sector can depend on one or more observed and/or measured characteristics of the particular radio sector. For a negatively responsive or non-responsive radio sector, the mobile wireless device can space transmission messages further apart as the number of successive failures increases, thereby reducing the number of transmissions within a given time interval and conserving battery power. The mobile wireless device can also compare current radio frequency signal conditions for the particular radio sector, e.g. receive radio frequency signal qualities measured at the mobile wireless device, to past measurements to determine if and when changes in radio frequency conditions for the mobile wireless device within the particular radio sector occur. When radio frequency signal conditions for a non-responsive radio sector improve, the mobile wireless device can increase the frequency of transmissions to the non-responsive radio sector, as previously lost or corrupted signaling messages can be able to be received more successfully by the radio sector (and by the mobile wireless device) under the improved radio frequency signal conditions. By limiting transmissions to non-responsive radio sectors, the battery life of the mobile wireless device can be improved.

These and other embodiments are discussed below with reference to FIGS. 1-19. However, those skilled in the art will readily appreciate that the detailed description given herein with respect to these figures is for explanatory purposes only and should not be construed as limiting.

FIG. 1A illustrates a representative generic wireless communication network 100 that can include multiple mobile wireless devices 102 connected by radio links 126 to radio sectors 104 provided by a radio access network 128. Each radio sector 104 can represent a geographic area of radio coverage emanating from an associated radio node 108 using a radio frequency carrier at a selected frequency. Radio sectors 104 can have different geometric shapes depending on antenna configuration, such as radiating outward in an approximate circle or hexagon from a centrally placed radio node 108 or cone shaped for a directional antenna from a corner placed radio node 108. Radio sectors 104 can overlap in geographic area coverage so that the mobile wireless device 102 can receive signals from more than one radio sector 104 simultaneously. Each radio node 108 can generate one or more radio sectors 104 to which the mobile wireless device 102 can connect by one or more radio links 126.

In some wireless networks 100, the mobile wireless device 102 can be connected to more than one radio sector 104 simultaneously. The multiple radio sectors 104 to which the mobile wireless device 102 is connected can come from a single radio node 108 or from separate radio nodes 108 that can share a common radio controller 110. A group of radio nodes 108 together with the associated radio controller 110 can be referred to as a radio access subsystem 106. Typically each radio node 108 in a radio access subsystem 106 can include a set of radio frequency transmitting and receiving equipment mounted on an antenna tower, and the radio controller 110 connected to the radio nodes 108 can include electronic equipment for controlling and processing transmitted and received radio frequency signals. The radio controller 110 can manage the establishment, maintenance and release of the radio links 126 that connect the mobile wireless device 102 to the radio access network 128.

The radio access network 128, which provides radio frequency air link connections to the mobile wireless device 102, connects also to a core network 112 that can include a circuit switched domain 122, usually used for voice traffic, and a packet switched domain 124, usually used for data traffic. Radio controllers 110 in the radio access subsystems 106 of the radio access network 128 can connect to both a circuit switching center 118 in the circuit switched domain 122 and a packet switching node 120 in the packet switched domain of the core network 112. The circuit switching center 118 can route circuit switched traffic, such as a voice call, to a public switched telephone network (PSTN) 114. The packet switching node 120 can route packet switched traffic, such as a "connectionless" set of data packets, to a public data network (PDN) 116.

Figure 1B:
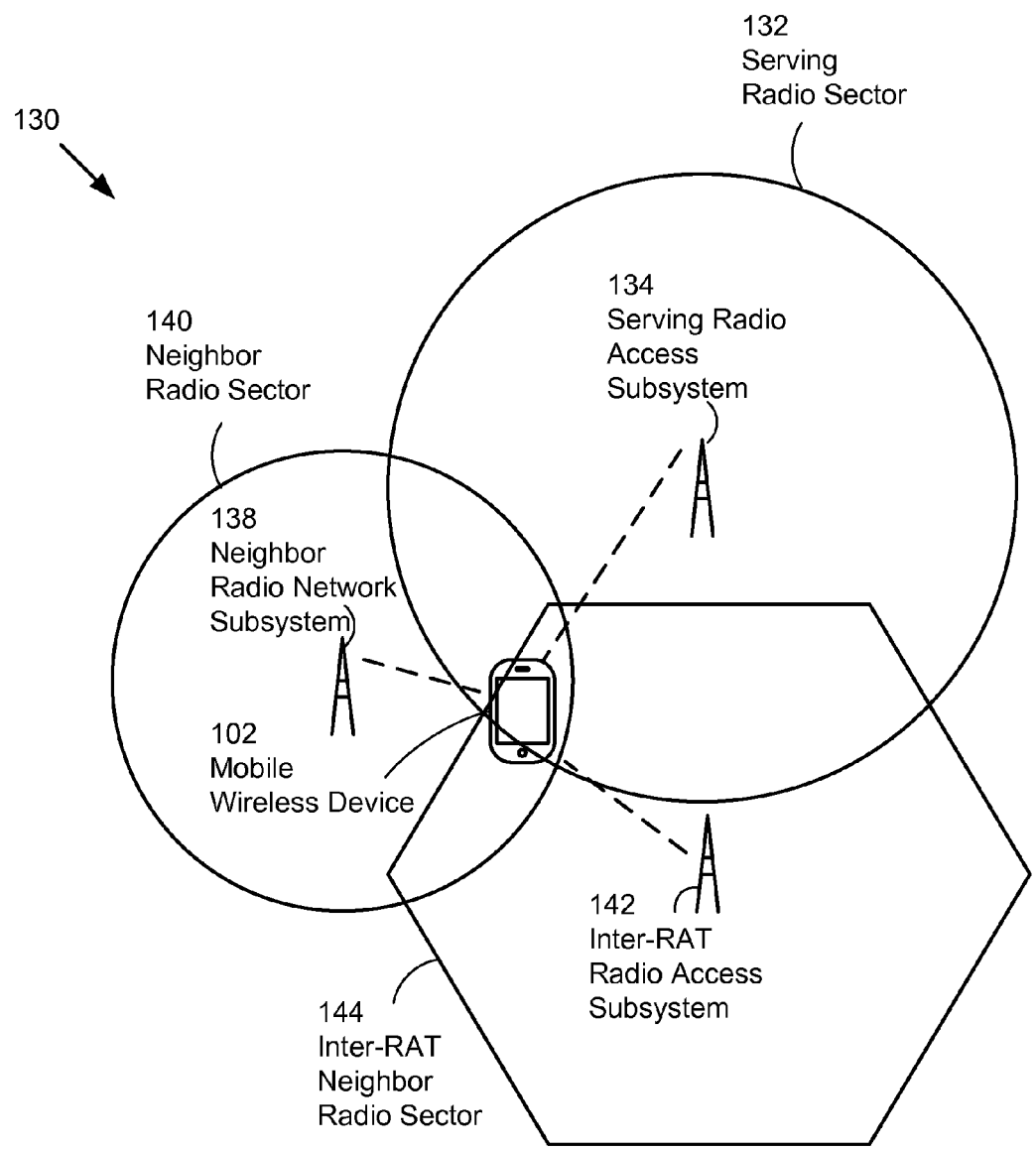
FIG. 1B illustrates a mobile wireless device and several overlapping radio sectors (cells) for multiple wireless networks.

FIG. 1B illustrates a set of overlapping radio sectors for a wireless network 130 that can use more than one radio frequency access technology. (In some wireless technologies, the term radio sector can be replaced by the term cell to indicate an area of geographic coverage. Without loss of generality, the generic term "radio sector" will be used in this application.) The mobile wireless device 102 can be associated with a serving radio sector 132 generated by a serving radio access subsystem 134. A neighbor radio sector 140 for a neighbor radio network subsystem 138 can be within range of the mobile wireless device, albeit at a greater distance than the current serving radio access subsystem 134. An "inter-RAT" (radio access technology) neighbor radio sector 144 generated by an inter-RAT radio access subsystem 142 can also overlap with the serving radio sector 132 and the neighbor radio sector 140. The mobile wireless device 102 can periodically measure radio frequency signals received from each of the radio sectors 132/140/144 and can choose to change association from the current serving radio sector 132 to either the neighbor radio sector 140 or the inter-RAT neighbor radio sector based on the measured receive radio frequency signals and one or more radio sector selection criteria. The mobile wireless device 102 can be configured to prefer associating with "stronger" radio sectors having higher measured radio frequency signal quality over "weaker" radio sectors having lower measured radio frequency signal quality. The mobile wireless device 102 can be configured to attempt to switch from a "weaker" radio sector to a "stronger" radio sector, when a currently measured radio frequency signal quality value exceeds a stored measured radio frequency signal quality value by a signal quality threshold value. The mobile wireless device 102 can also be configured to prefer associating with a radio sector that uses a later generation wireless communication protocol (e.g. an LTE network) over a radio sector that uses an earlier generation wireless communication protocol (e.g. a GSM network).

Under acceptable network conditions, e.g. adequate radio frequency resources and good radio frequency signal quality, the mobile wireless device 102 can transfer associations between different radio sectors seamlessly. Under adverse network conditions, the mobile wireless device can be unable to receive a positive response from a preferred radio sector to one or more signaling messages. For example, the mobile wireless device 102 can be initially associated with the serving radio sector 132 and can prefer to be associated with the neighbor radio sector 140 as the receive signal quality from the neighbor radio sector 140 can be higher than the receive signal quality from the serving radio sector 140 by at least a signal quality threshold value. The neighbor radio network subsystem 138, however, can negatively respond to signaling messages from the mobile wireless device 102 due to unspecified adverse network conditions, such as network congestion. Despite the negative response received from the neighbor radio network subsystem 138, the mobile wireless device 102 can persist in sending signaling messages to the neighbor radio sector 140, as the neighbor radio sector can have "higher priority" over the serving radio sector 132. Repeatedly sending signaling messages and receiving negative responses can drain limited battery resources. Similarly when the mobile wireless device seeks to associate with the inter-RAT radio sector 144 (e.g. when the inter-RAT neighbor radio sector offers a preferred set of network capabilities), the mobile wireless device 102 can repeatedly attempt to re-select to the inter-RAT neighbor radio sector 144, even when receiving multiple negative responses or no response from the inter-RAT neighbor radio sector 144. As described further below, the mobile wireless device 102 can improve its battery life by recognizing the adverse network conditions and moderating the transmission of signaling messages until the network conditions improve.

Figure 2:
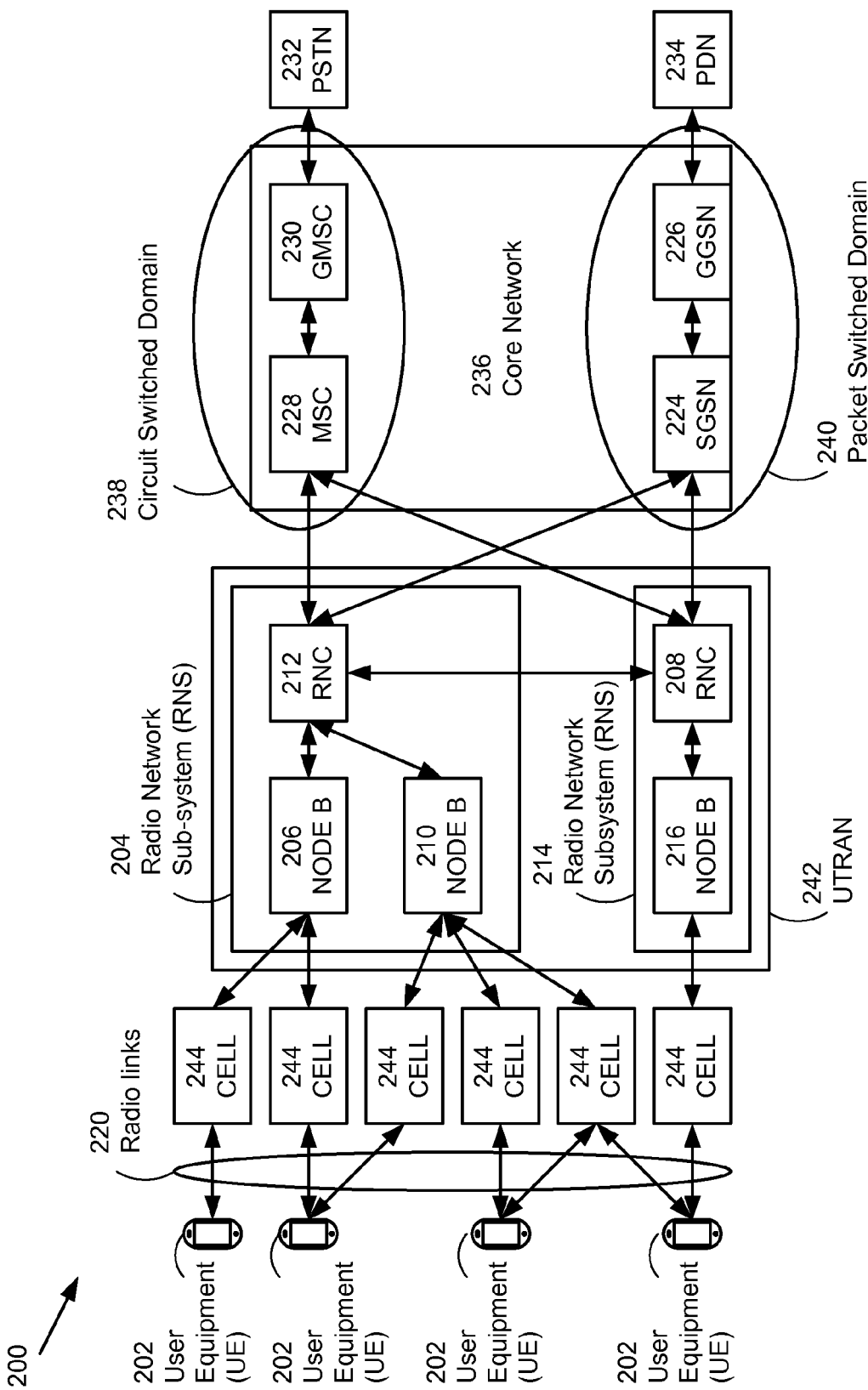
FIG. 2 illustrates components of a UMTS wireless communication network.

FIG. 2 illustrates a representative UMTS wireless communication network 200 that can include one or more user equipment (UE) 202 that can communicate with a UMTS terrestrial radio access network (UTRAN) 242 that can connect to a core network (CN) 236. The core network 236 can include a circuit switched domain 238 that can connect the UE 202 to a public switched telephone network (PSTN) 232 and a packet switched domain 240 that can connect the UE 202 to a packet data network (PDN) 234. The UTRAN 242 can include one or more radio network sub-systems (RNS) 204/214 each of which can include a radio network controller (RNC) 208/212 and one or more Node-Bs (base stations) 206/210/216 managed by a corresponding RNC. The RNC 208/212 within the UTRAN 242 can be interconnected to exchange control information and manage packets received from and destined to the UE 202. Each RNC 208/212 can handle the assignment and management of radio resources for the cells 244 through which the UE 202 connect to the wireless network 200 and can operate as an access point for the UE 202 with respect to the core network 236. (Cells 244 in the UMTS network 200 can be considered equivalent to radio sectors 104 in the generic wireless communication network 100.) The Node-B 206/210/216 can receive information sent by the physical layer of UE 202 through an uplink and transmit data to UE 202 through a downlink and can operate as access points of the UTRAN 242 for UE 202. Signaling messages exchanged between the UE 202 and the RNS 204/214 in the wireless network 200 can be transported using the radio links 220 through one or more cells 244. Setting up and tearing down the radio links 220 can be under the control of the RNC 212 in the RNS 204, and the UE 202 can request one or more radio links 220 to transport signaling messages during registration, location updates or other maintenance processes.

UTRAN 242 can construct and maintain a radio access bearer (RAB) for communication between UE 202 and the core network 236. Services provided to a specific UE 202 can include circuit switched (CS) services and packet switched (PS) services. For example, a general voice conversation can be transported through a circuit switched service, while a Web browsing application can provide access to the World Wide Web (WWW) through an internet connection that can be classified as a packet switched (PS) service. To support circuit switched services, the RNC 208/212 can connect to the mobile switching center (MSC) 228 of core network 236, and MSC 228 can be connected to gateway mobile switching center (GMSC) 230, which can manage connections to other networks, such as the PSTN 232. To support packet switched services, the RNC 208/212 can also be connected to serving general packet radio service (GPRS) support node (SGSN) 224, which can connect to gateway GPRS support node (GGSN) 226 of core network 236. SGSN 224 can support packet communications with the RNC 208/212, and the GGSN 226 can manage connections with other packet switched networks, such as the PDN 234. A representative PDN 234 can be the "Internet".

Figure 3:
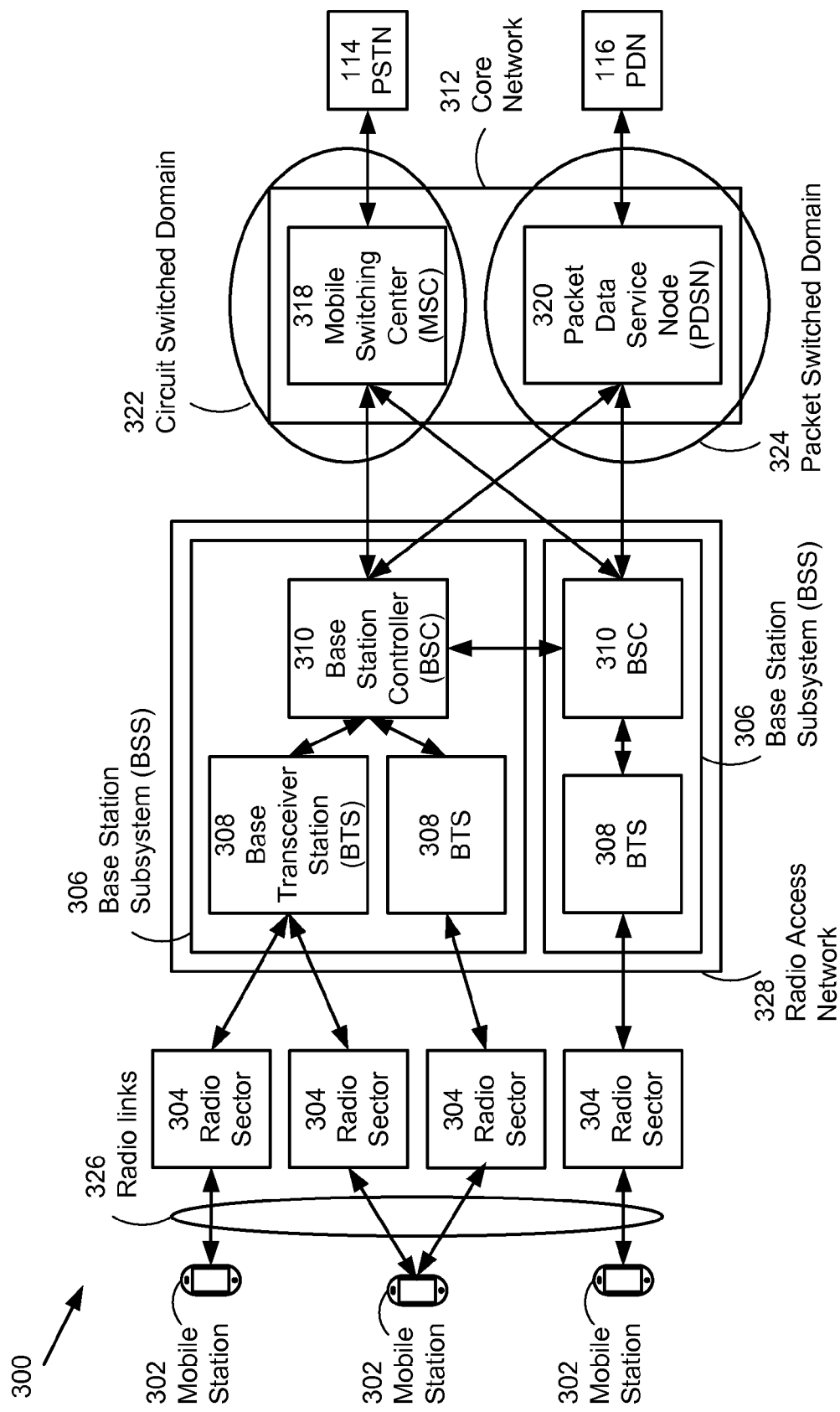
FIG. 3 illustrates components of a CDMA2000 1x wireless communication network.

FIG. 3 illustrates a representative CDMA2000 wireless network 300 that can include elements comparable to those described earlier for the generic wireless network 100 and the UMTS wireless network 200. Multiple mobile stations 302 can connect to one or more radio sectors 304 through radio frequency links 326. Each radio sector 304 can radiate outward from a base transceiver station (BTS) 308 that can connect to a base station controller (BSC) 310, together forming a base station subsystem (BSS) 306. Multiple base station subsystems 306 can be aggregated to form a radio access network 328. Base station controllers 310 in different base station subsystems 306 can be interconnected. The base station controllers 310 can connect to both a circuit switched domain 322 that use multiple mobile switching centers (MSC) 318 and a packet switched domain 324 formed with packet data service nodes (PDSN) 320, which together can form a core network 312 for the wireless network 300. As with the other wireless networks 100/200 described above, the circuit switched domain 322 of the core network 312 can interconnect to the PSTN 114, while the packet switched domain 324 of the core network 312 can interconnect to the PDN 116. As described above for the generic wireless network 100 and the UMTS wireless network 200, signaling messages can be exchanged between the mobile station 302 and the BSS 306 in the wireless network 300 over radio links 326 through one or more radio sectors 304. Establishing and releasing the radio links 326 can be under the control of the BSC 310 in the BSS 306, and the mobile station 302 can request one or more radio links 326 to transport signaling messages during registration, location updates or other maintenance processes.

Figure 4:
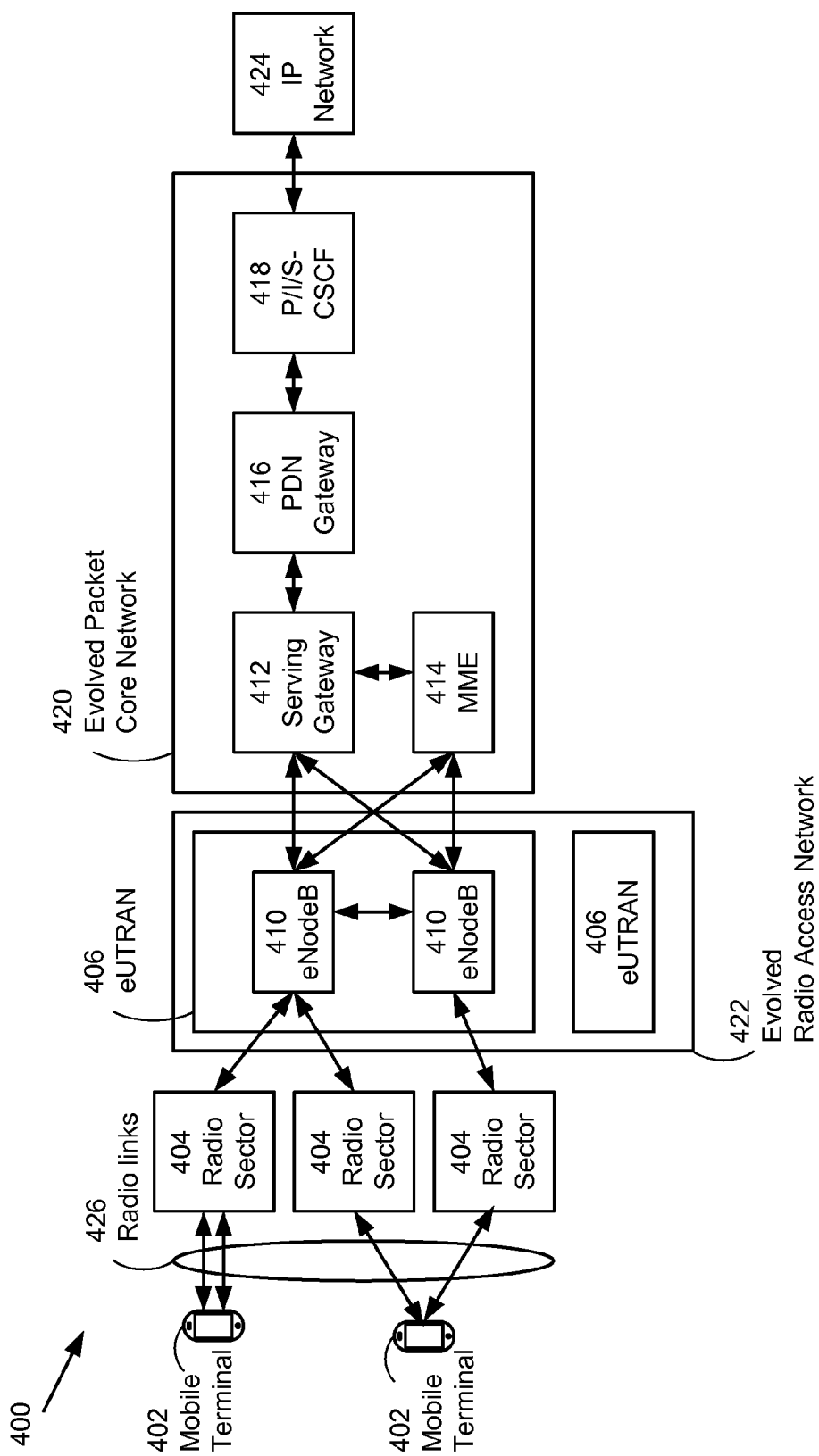
FIG. 4 illustrates components of a LTE wireless communication network.

FIG. 4 illustrates a representative Long Term Evolution (LTE) wireless network 400 architecture designed as a packet switched network exclusively. A mobile terminal 402 can connect to an evolved radio access network 422 through radio links 426 associated with radio sectors 404 that emanate from evolved Node B's (eNodeB) 410. The eNodeB 410 includes the functions of both the transmitting and receiving base stations (such as the radio nodes 108 in the generic wireless communication network 100, the Node B 206 in the UMTS network 200 and the BTS 308 in the CDMA2000 network 300) as well as the base station radio controllers (such as the radio controller 110 in the generation wireless network, the RNC 212 in the UMTS network 200 and the BSC 310 in the CDMA2000 network 300). The equivalent core network of the LTE wireless network 400 is an evolved packet core network 420 including serving gateways 412 that interconnect the evolved radio access network 422 to public data network (PDN) gateways 416 that connect to external internet protocol (IP) networks 418. Multiple eNodeB 410 can be grouped together to form an evolved UTRAN (eUTRAN) 406. The eNodeB 410 can also be connected to a mobility management entity (MME) 414 that can provide control over connections for the mobile terminal 402. Signaling messages can be exchanged between the mobile terminal 402 and the eUTRAN 406 in the wireless network 400 over radio links 426 through one or more radio sectors 404. The eNodeB 410 can control establishing and releasing the radio links 426. The mobile station 302 can request one or more radio links 426 to transport signaling messages during registration, location updates or other maintenance processes.

Figure 5:
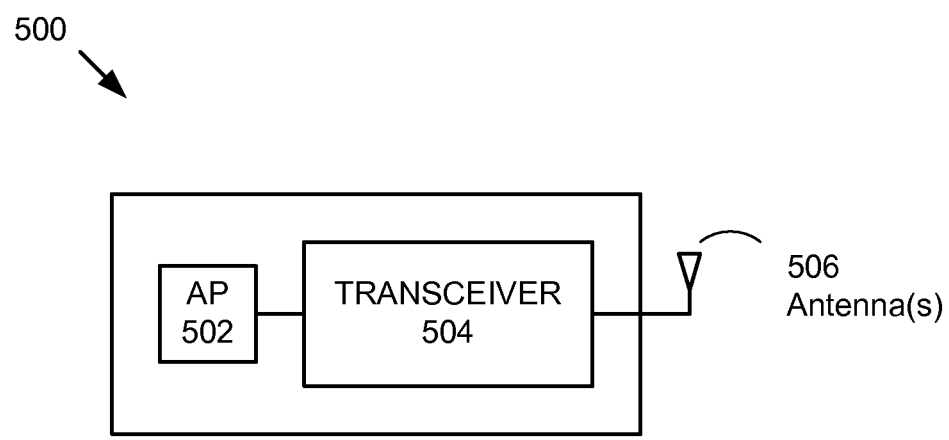
FIG. 5 illustrates several representative architectures for a mobile wireless communication device.

FIG. 5 illustrates select elements of a mobile wireless device 500. The mobile wireless device 500 can include a transceiver 504 that can process signals according to one or more wireless communication protocols. In some embodiments, the mobile wireless device 500 can include multiple transceivers (not illustrated). The transceiver 504 can be connected to an application processor (AP) 502 that can provide higher layer functions, such requesting establishment and release of connections for various resident application services. The transceiver(s) 504 can provide lower layer functions that can support the transport of data for higher layer services ordered by the application processor 502. In some embodiments, the AP 502 and the transceiver 504 can be part of the same integrated circuit, while in other embodiments, the AP 502 and the transceiver 504 can be separate devices. In some embodiments, the division of higher layer and lower layer functions between the AP 502 and the transceiver 504 can be flexible. In some embodiments, at least some of lower layer functions and/or management of lower layer functions can be executed by the AP 502, with the transceiver 504 dedicated to lowest layer (e.g. physical layer) functions. The transceiver 504 can be connected to one or more antennas 506 that can transmit and receive signals according to the one or more wireless communication protocols. The use of multiple antennas for certain wireless communication protocols can provide improved performance (e.g. higher data rates or better immunity to interference) compared to a single antenna configuration.

Figure 6:
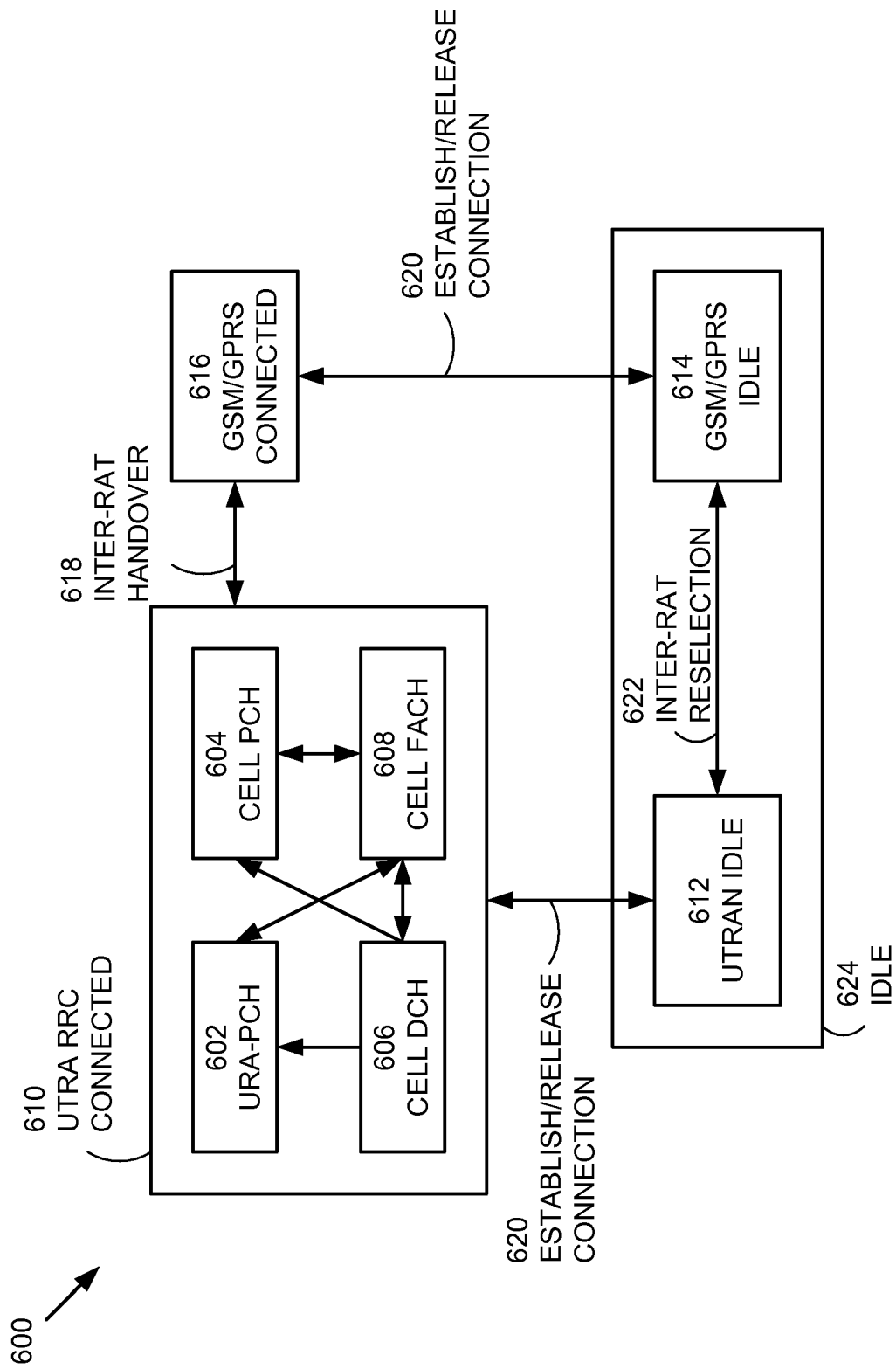
FIG. 6 illustrates a state transition diagram for a mobile wireless communication device for a UMTS wireless network and a GSM wireless network.

FIG. 6 illustrates a state transition diagram 600 having several states for a radio resource control (RRC) portion of a protocol stack for a UE 202 in a wireless network that supports both UMTS and GSM/GPRS wireless communication protocols. The UE 202 can be in an unconnected IDLE state 624, in a UTRA RRC connected state 610 or in a GSM/GPRS connected state 616. In IDLE state 624, UE 202 can request to establish a signaling connection with the wireless network. The UE 202 can use the signaling connection for communication with the wireless network, such as when registering with the network or providing location updates. In an embodiment, the signaling connection can be referred to as an RRC connection. The UE 202 can also request to establish an RRC connection in order to allocate radio resources (e.g. radio access bearers) for communication with the wireless network whenever data is available to exchange between UE 202 and the UTRAN 242. Establishing the RRC connection can occur when an application on UE 202 requires a connection to send data or retrieve data from the network, when initiating a mobile voice connection, and when terminating a connection for the UE 202 after receiving a page on a paging channel from the UTRAN 242 or SGSN 224 indicating data available from an external data network. Once UE 202 has sent a request to UTRAN 242 to establish a radio connection, UTRAN 242 can choose a state for the RRC connection. The UTRA RRC connected state can include four separate states, CELL_DCH state 606, CELL_FACH state 608, CELL_PCH state 604 and URA_PCH state 602.

From a UTRAN "idle" state 612 within the IDLE state 624, UE 202 can transition to the CELL_FACH state 608, in which it can make an initial data transfer, subsequent to which the wireless network can determine which RRC connected state to use for continued data transfer. The wireless network can move UE 202 into the Cell Dedicated Channel (CELL_DCH) state 606 or keep UE 202 in the Cell Forward Access Channel (CELL_FACH) state 608. In CELL_DCH state 606, a dedicated channel can be allocated to UE 202 for both uplink and downlink to exchange data. Alternatively, rather than place the UE 202 in the CELL_DCH state, UTRAN 242 can maintain UE 202 in a CELL_FACH state 608. In a CELL_FACH state 608 no dedicated channel can be allocated to UE 202. Instead, common channels can be used to send signaling in relatively small bursts of data.

The UE 202 can transition between the UTRAN "idle" state 612 to the GSM/GPRS "idle" state 614 through a process known as inter-radio access technology (RAT) reselection 622. Transitioning by reselection 622 from the UTRAN IDLE 612 to GSM/GPRS IDLE 614 state can occur when the wireless network can be unable to support a UMTS (3G) connection and a GSM/GPRS (2G) connection can serve as a backup. The UE 202 can also transition between the UTRA "RRC connected" state 610 to the GSM/GPRS "connected" state 616 through a process referred to as inter-RAT handover 618. For certain wireless communication protocols, a handover between one wireless network using one wireless communications technologies and a second network using a different wireless technology can occur while maintaining an active connection. For other wireless communication protocols, the handover can occur only in an idle state, i.e. active connections cannot be maintained upon handover, which can thus require releasing and establishing connections (transitions 620). A signaling connection between the UE 202 and the RNS 204/214 in the UTRAN 242 can be required to effect the establishment and release of data/voice connections (transitions 620) and to switch between different wireless communication protocols, e.g. inter-RAT reselection 622 in the idle state and inter-RAT handover 618 in the connected state.

Figure 7:
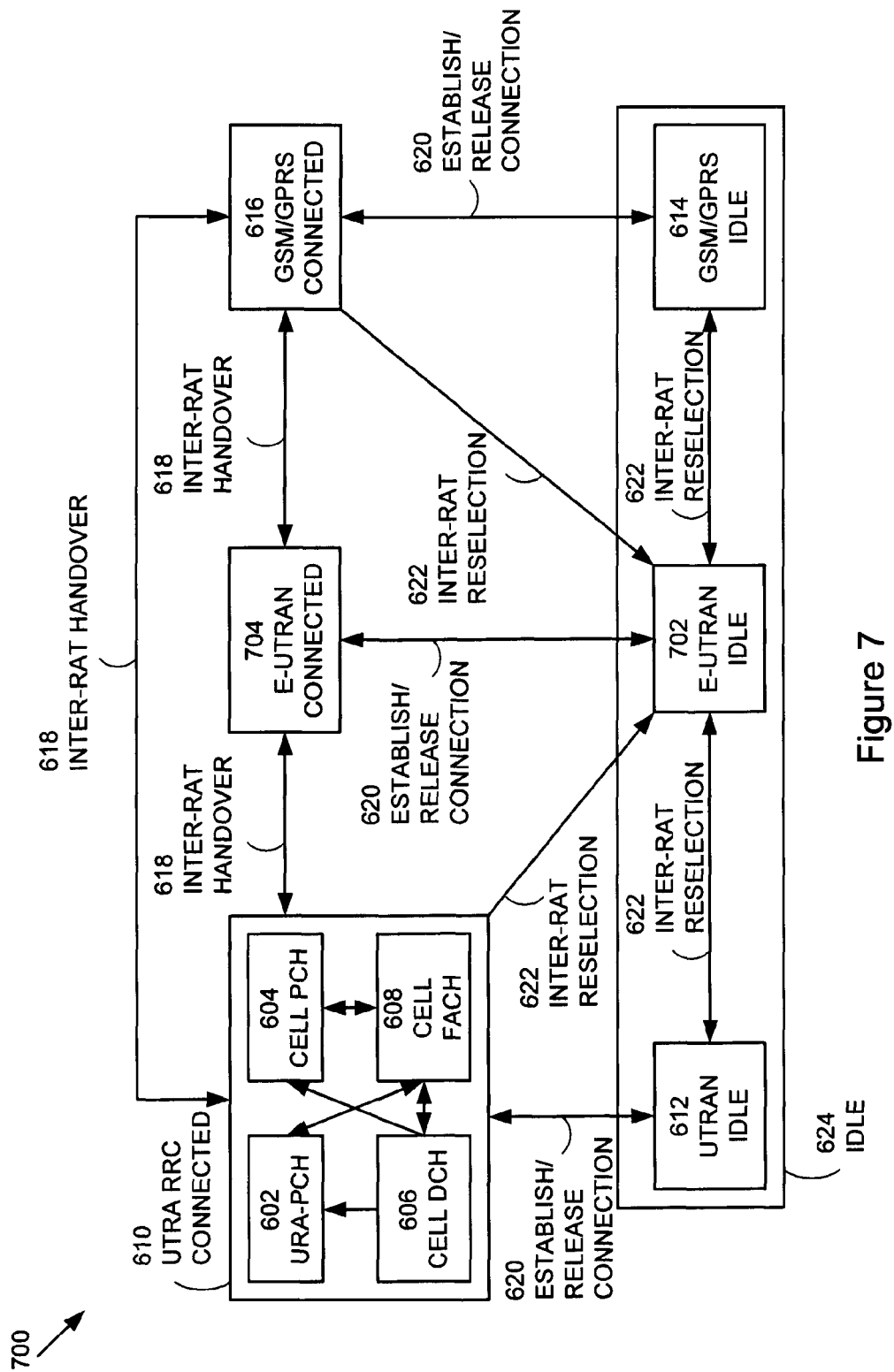
FIG. 7 illustrates a state transition diagram for a mobile wireless communication device for a UMTS wireless network, an LTE wireless network and a GSM wireless network.

FIG. 7 illustrates a state transition diagram 700 that extends the state transition diagram of FIG. 6 to include states for the LTE network 400. Transitions between an active E-UTRAN connected state 704 and the connected states of the GSM/UMTS networks can be accomplished through inter-RAT handovers 618. Transitions between the E-UTRAN connected state 704 and the E-UTRAN idle state 702 can be effected by establishing and releasing connections 620. Transitions between the E-UTRAN idle state 702 and the idle states of the GSM/GPRS/UMTS networks can use inter-RAT reselection 622 processes. In addition to transitions between connected states and between idle states, a mobile wireless device can also transition from a UTRA RRC connected state 610 or a GSM/GPRS connected state 616 to a E-UTRAN idle state 702 by inter-RAT reselection 622. A mobile wireless device can also transition between the UTRA RRC connected state 610 and the GSM/GPRS connected state 616 by an inter-RAT handover as shown previously in FIG. 6 and repeated in FIG. 7.

Figure 8:
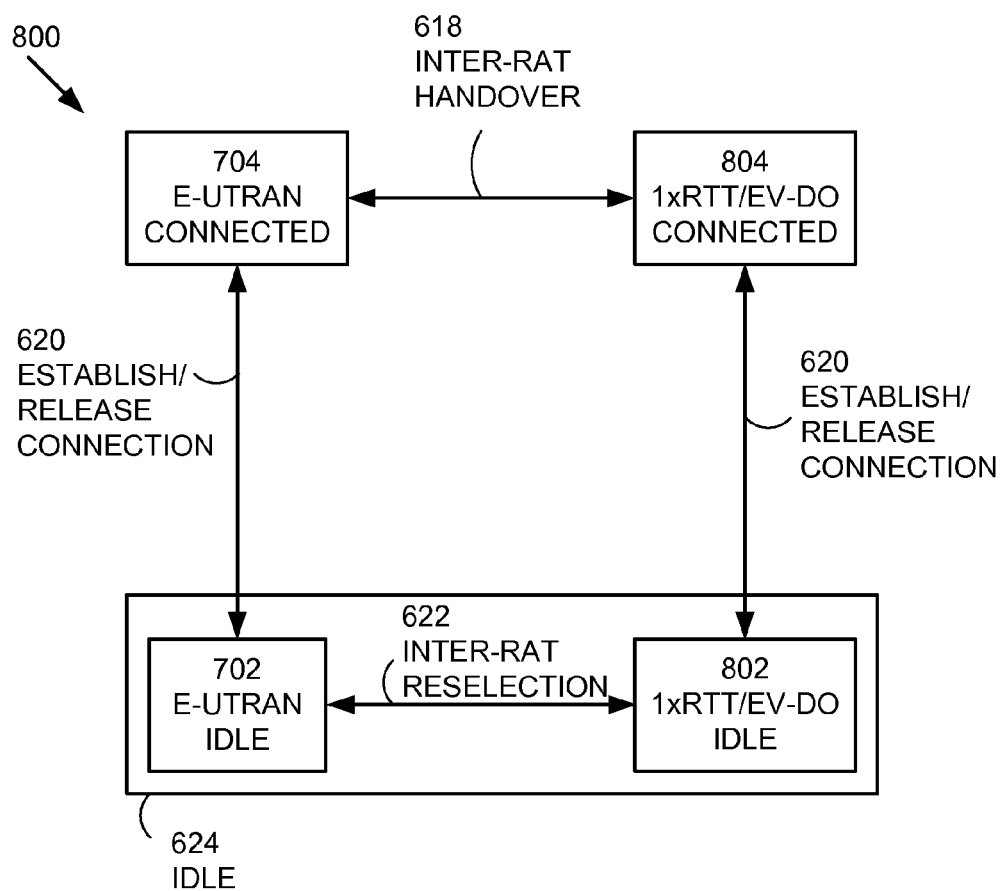
FIG. 8 illustrates a state transition diagram for a mobile wireless communication device for an LTE wireless network and a CDMA2000 1x wireless network.

FIG. 8 illustrates a state transition diagram 800 between states in an LTE network 400 and a CDMA2000 1x network 300. A mobile wireless device in the CDMA2000 1x network 300 can be in a 1xRTT/EV-DO idle state 802 and can establish and release connections 620 to transition between the /EV-DO idle state 802 and a 1xRTT/EV-DO connected state 804. Transition between the /EV-DO idle state 802 and the E-UTRAN IDLE state 702 can be effected through an inter-RAT reselection 622 process, while transition between the 1xRTT/EV-DO connected state 804 can be realized using the inter-RAT handover 618 procedure. The inter-RAT handover 618 can permit maintaining a current active connection while transitioning between two networks that use two different wireless communication protocols. The inter-RAT reselection 622 can provide a mechanism to select between two different radio access technologies while associated with but not actively connected to one of the wireless networks 300/400.

For any of the state transition diagrams illustrated in FIGS. 6, 7 and 8, a mobile wireless device 102 can require a signaling connection in order to register with a wireless network (i.e. to enter an idle state initially), to update a location, to establish a connection, to reselect between different radio access technologies and other functions. In addition, when reselecting between radio sectors that use the same radio access technology, the mobile wireless device 102 can also require a signaling connection to effect a transition between radio sectors in the same wireless network when the two radio sectors are located in separate locating areas, routing areas and/or tracking areas. A location area for a wireless network 100 can include multiple radio nodes 108 and one or more radio controllers 110. Each location area can have a unique location area identity (LAI). When switching between radio sectors 104 within a location area, no update can be required; however, when switching between radio sectors 104 located in different location areas, a location area update from the mobile wireless device 102 to the wireless network 100 can be required. Crossing location area boundaries can depend on the movement of the mobile wireless device 102, which can vary substantially for different mobile wireless devices 102 and at different times. A location area update precipitated by a change of location can be referred to as a "random" location area update. The mobile wireless device 102 can also update its location to the wireless network 100 periodically after a set time interval, and these updates can be referred to as "periodic" location area updates.

Some wireless networks can include "routing areas" which can differ from "location areas" in geographic coverage, where the routing area is used for packet switched data traffic and the location area is used for circuit switched voice traffic. Typically, routing areas are smaller than location areas, with multiple routing areas per location area. The mobile wireless device 102 can perform routing area updates in a similar manner to location area updates. Some wireless networks refer to these location updates more generally as tracking area updates, and the description herein can refer equally to location area updates, routing area updates and/or tracking area updates.

Figure 9:
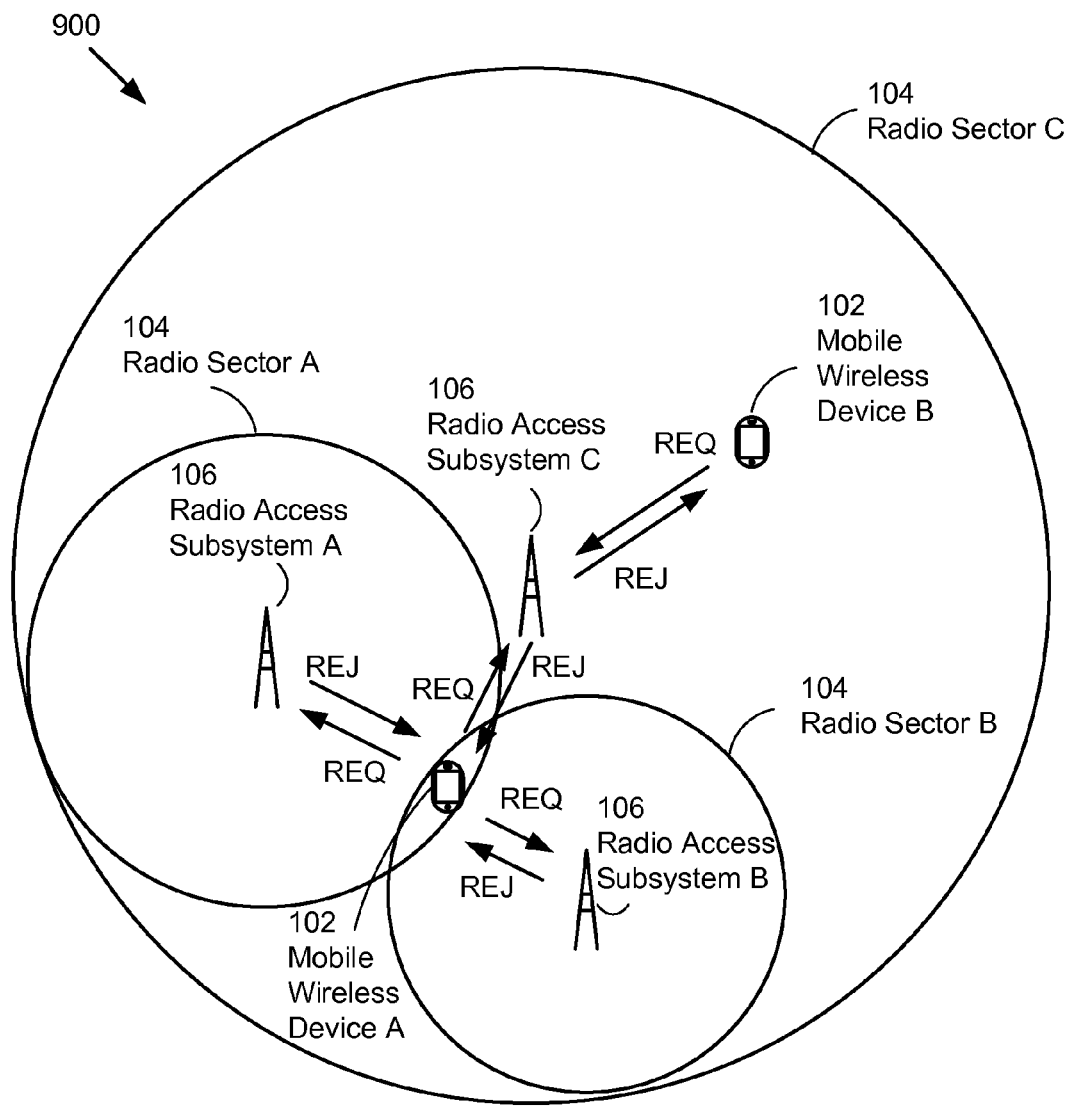
FIGS. 9 and 10 illustrate two mobile wireless devices attempting communication with several different overlapping radio sectors of a wireless network.

FIG. 9 illustrates a scenario 900 in which mobile wireless devices 102 attempt to establish communication with one or more radio access subsystems 106 in a set of three overlapping radio sectors 104 A, B and C. A first mobile wireless device 102 A can be positioned in a region covered by all three radio sectors 104 A, B and C, while a second mobile wireless device 102 B can be within range of only one radio sector 104 C. The first mobile wireless device 102 A can be initially not associated with any of the radio sectors 104 and can transmit one or more signaling messages, such as one or more requests (REQ) to establish a signaling connection in order to register with one or more of the radio sectors 104. In return, each radio access subsystem 106 as shown can transmit to the mobile wireless device 102 A signaling messages that reject (REJ) the request to establish the signaling connection. A rejection can occur based on one or more network conditions, e.g. network congestion, prioritization of available radio resources and interference levels at the radio access subsystem 106 receiving the request. The mobile wireless device can continue to send requests to the wireless network and can receive rejections in a continuous cycle that can rapidly drain battery power.

Even after a successful registration, while in an idle state, the mobile wireless device 102 can transmit a series of requests for signaling connections and receive rejections in a rapid cycle that can consume limited available energy stored in the mobile wireless device 102. The mobile wireless device 102 A can be associated with one of the radio sectors, e.g. radio sector 104 A emanating from radio access subsystem 106, and can request a signaling connection in order to re-select to another radio sector 104, e.g. radio sector 104 B or radio sector 104 C. The mobile wireless device 102 A can prefer to be associated with and/or connected to the wireless network through one of several radio sectors 104, e.g. a radio sector 104 having the strongest signal quality as measured by the mobile wireless device 102 A. The mobile wireless device 102 A can persistently request signaling connections with the preferred radio sector 104 over a current radio sector 104 even when receiving multiple rejections to the repeated requests. This request and reject cycle can unnecessarily drain limited battery resources, when the signaling requests repeatedly fail. Similarly, battery drain can occur for any sequence of signaling messages sent persistently from the mobile wireless device 102 to the wireless network when receiving negative responses from one or more radio access subsystems in a wireless network.

Figure 10:
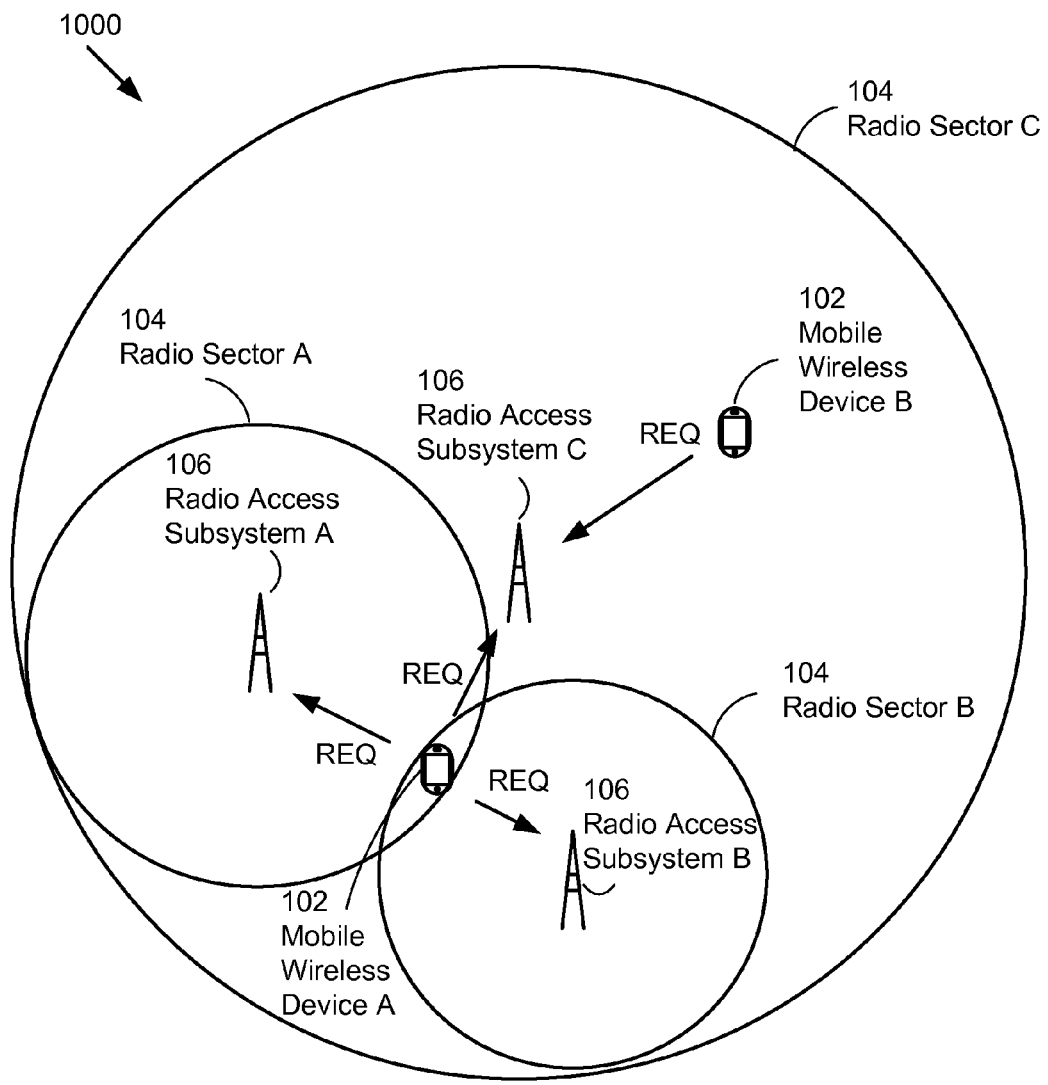

FIG. 10 illustrates another scenario 1000 in which the mobile wireless devices 102 can receive no response from the one or more radio access subsystems 106. Signaling messages from the mobile wireless devices 102 to the radio access subsystems 106, e.g. requests to establish radio resource signaling connections, can be "lost" or corrupted in transmission, in which case, the radio access subsystem can provide no response to the transmitted signaling messages. Similarly, responses to the signaling messages can be transmitted by one or more of the radio access subsystems 106 but can be corrupted and/or severely attenuated during transmission and can be not received or be decodable by the mobile wireless devices 102. In the absence of receiving a response, the mobile wireless device 102 can resend the signaling messages, e.g. requests to establish a signaling connection, requests to register the mobile wireless device 102 with the wireless network, request to setup a data or voice connection, or requests to update a current location of the mobile wireless device 102 in the wireless network. Repeated transmissions of signaling messages by the mobile wireless device 102 to non-responsive radio access subsystems 106 can result in an undesirable excessive battery drain.

Figure 11:
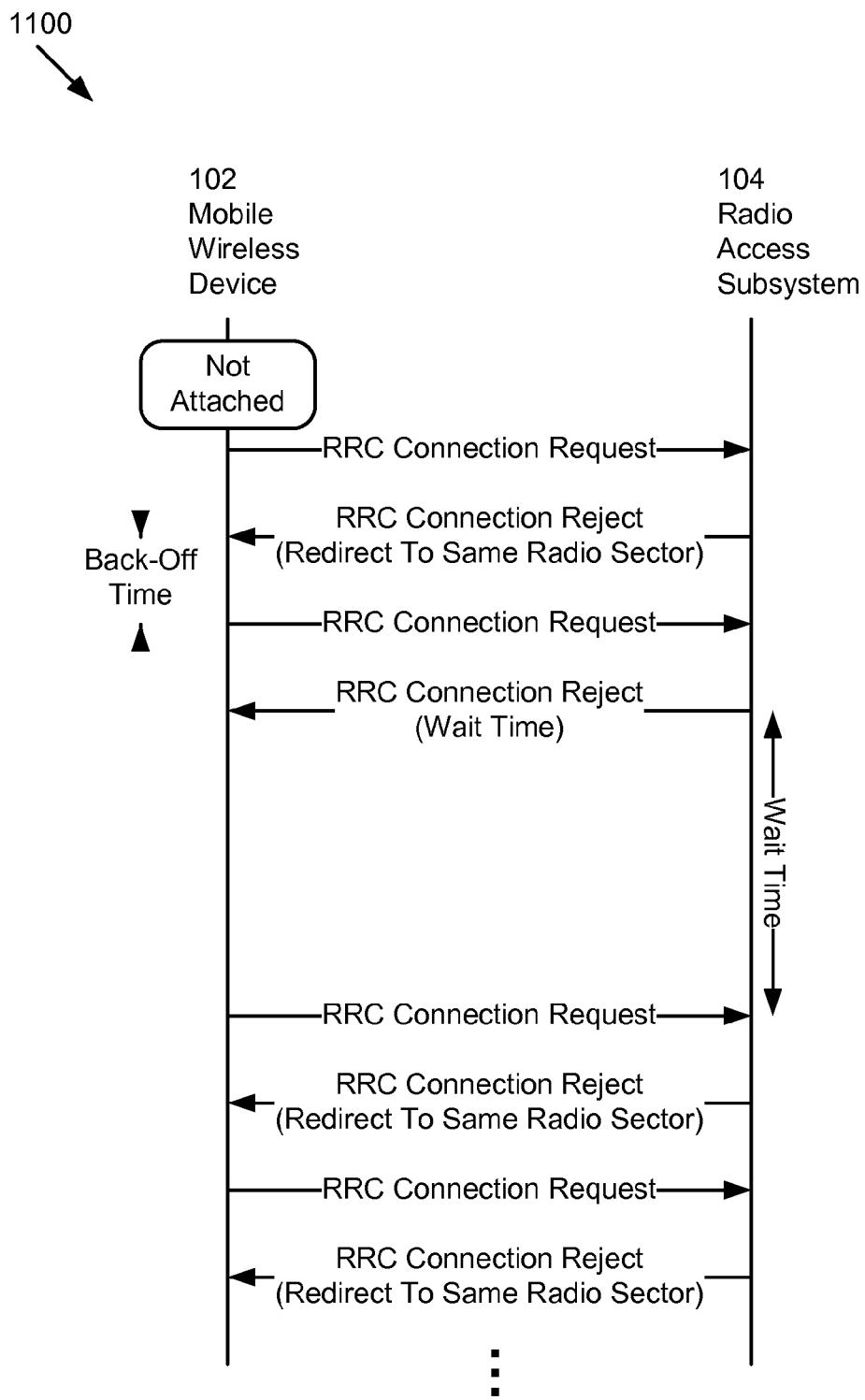
FIG. 11 illustrates a sequence of messages between the mobile wireless device and a radio access subsystem of a wireless network with an unsuccessful rejected connection request.

FIG. 11 illustrates a sequence of signaling messages 1100 between the mobile wireless device 102 and the radio access subsystem 106 of the wireless network 100, the sequence including rejected connection requests. (Initially the mobile wireless device 102 can be not attached to the wireless network 100. The mobile wireless device 102 can send a radio resource control (RRC) connection request signaling message to the radio access subsystem 106. The radio access subsystem 106 can respond to the RRC connection request signaling message with one of several different responses. In one response to the RRC connection request, the radio access subsystem 106 can transmit an RRC connection reject signaling message that can include a redirection indication to the mobile wireless device 102 to the same radio sector 104 of the radio access subsystem 106. After a back-off time interval, the mobile wireless device 102 can re-transmit another RRC connection request signaling message to the radio access subsystem 106. In another response to the RRC connection request, the radio access subsystem 106 can respond with an RRC connection reject signaling message that can include a wait time interval. After delaying transmission for the specified wait time interval, the mobile wireless device 102 can re-send an RRC connection request signaling message. When the radio access subsystem 106 chooses not to assign radio resources to the RRC connection request signaling message, the mobile wireless device 102 can transmit numerous requests and receive in turn numerous rejections. As a random back-off time period between successively transmitted requests can be relatively short, and a specified wait time can also be relatively short time intervals, persistent rejections by the radio access subsystem 106 can result in a relatively large number of transmitted RRC connection requests that can drain the battery of the mobile wireless device 102. Thus, it can be preferred that the mobile wireless device 102 recognize this situation and temporarily delay transmissions to the radio access subsystem 106 of the wireless network 100 in order to avoid fast battery drain.

Figure 12:
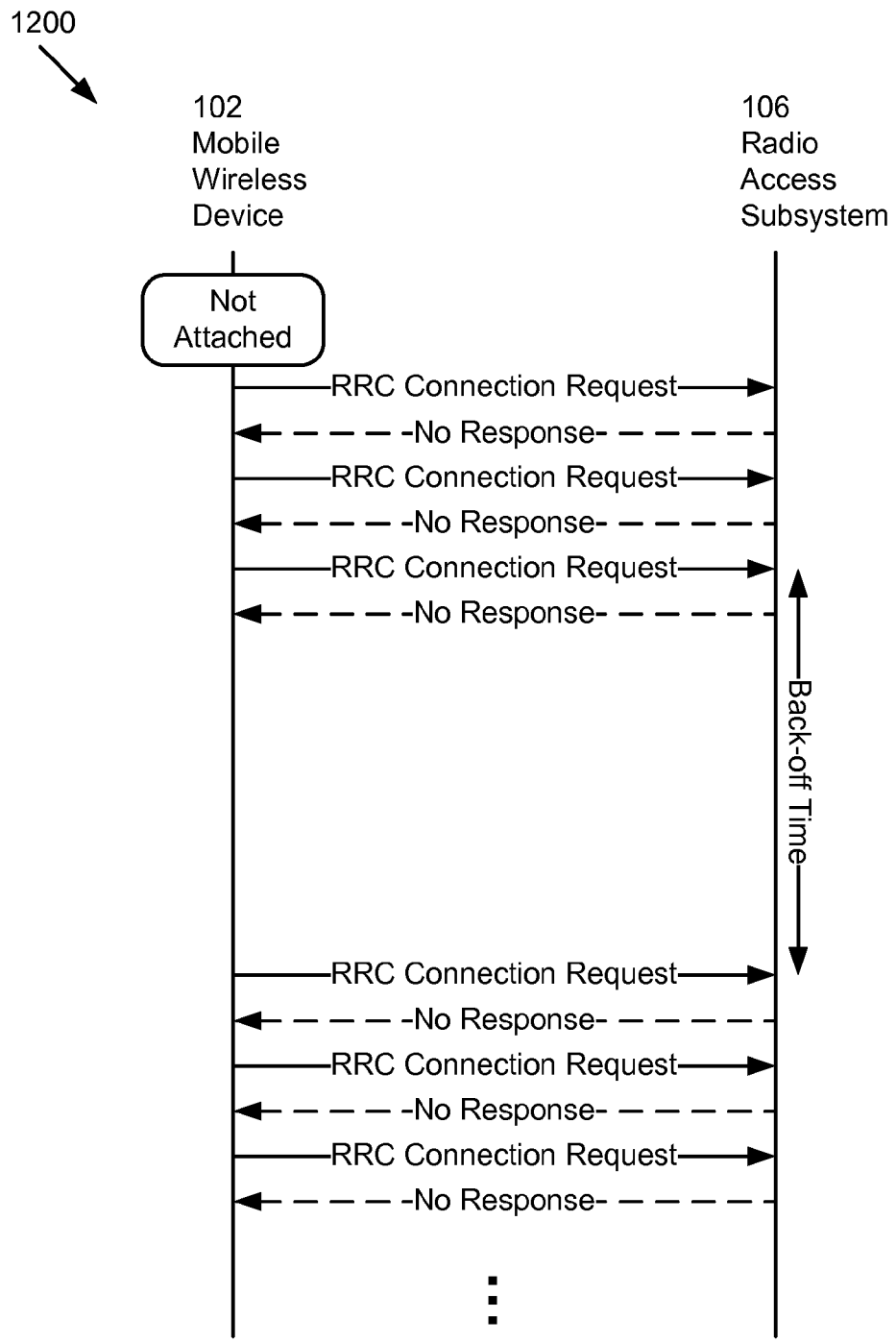
FIG. 12 illustrates a sequence of messages between the mobile wireless device and the radio access subsystem of the wireless network with an unsuccessful non-responsive connection request.

FIG. 12 illustrates a different scenario 1200 in which fast battery drain can occur when a series of RRC connection requests are transmitted by the mobile wireless device 102 to the radio access subsystem 106 of the wireless network 100 where no response can be received by the mobile wireless device 102. In an embodiment, the mobile wireless device 102 can send up to a pre-determined maximum number of RRC connection requests in the absence of receiving a response from the radio access subsystem 106, and the pre-determined maximum number can be specified by the radio access subsystem 106 of the wireless network 100. Each request can be sent by the mobile wireless device 102 after receiving no response from the radio access subsystem 106. After transmitting the series of RRC connection requests, the mobile wireless device 102 can wait a random back-off period of time and then resend again up to the pre-determined maximum number of RRC connection requests to the radio access subsystem 106. Successive sequences of bursts of RRC connection requests can persist when no response is received from the radio access subsystem 106 and can result in a power consumption drain on the limited battery resources available in the mobile wireless device 102. Thus again, it can be preferred that the mobile wireless device 102 recognize this situation and temporarily avoid transmissions to the radio access subsystem 106 of the wireless network 100 in order to avoid fast battery drain.

Figure 13:
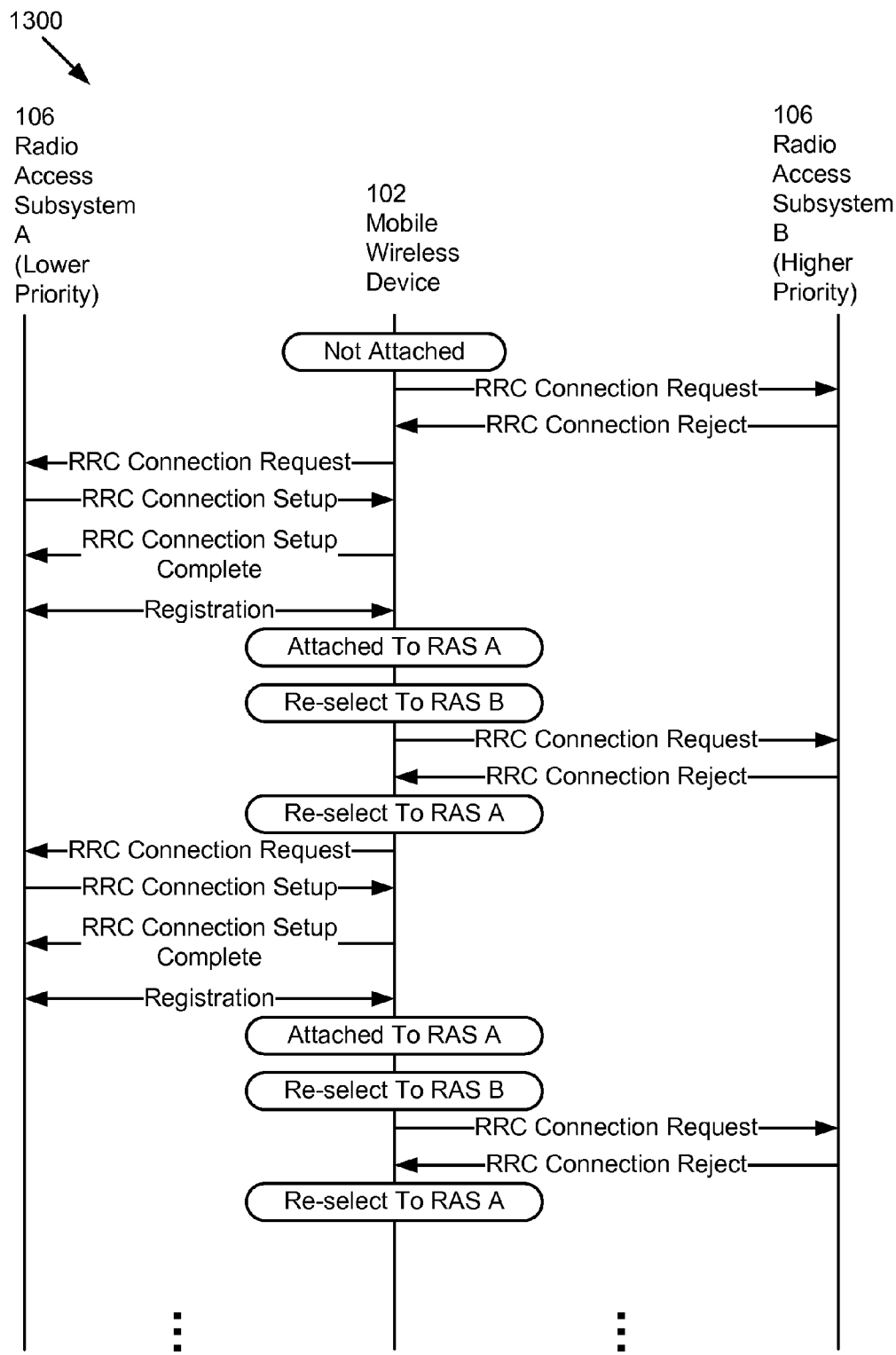
FIG. 13 illustrates a sequence of messages between the mobile wireless device and two different radio access subsystems from two different wireless networks.

FIG. 13 illustrates another scenario 1300 during which fast battery drain can occur in the mobile wireless device 102 where one radio access subsystem 106 can be preferred to another radio access subsystem 106 by the mobile wireless device 102; however, the preferred radio access subsystem 106 can negatively respond or provide no response to signaling messages from the mobile wireless device 102. Initially the mobile wireless device 102 can be not attached to either a radio access subsystem 106 A that can have a lower priority or to a radio access subsystem 106 B that can have a higher priority. Priority within the mobile wireless device 102 can be determined based on measured and/or received characteristics of the radio access subsystems 106, such as measured receive signal properties or network service information broadcast by the radio access subsystems 106. In a representative embodiment, the higher priority radio access subsystem 106 B can use a more recent generation wireless communication protocol, while the lower priority radio access subsystem 106 A can use an earlier generation wireless communication protocol. More recent generation wireless communication protocols can be preferred to earlier generation wireless communication protocols based on services that can be provided, e.g. higher data transmission rates or specific quality of service factors. In another representative embodiment, the mobile wireless device 102 can measure a higher receive signal quality from the higher priority radio access subsystem 106 B that exceeds a lower receive signal quality from the lower priority radio access subsystem 106 A by at least a signal quality threshold value.

The mobile wireless device 102 can initially send a signaling message to the higher priority radio access subsystem 106 B to request an RRC connection. The higher priority radio access subsystem 106 B can send a signaling message in response that rejects the RRC connection request, and the mobile wireless device 102 can send an RRC connection request to the lower priority radio access subsystem 106 A instead. The lower priority radio access subsystem 106 A can respond positively with an RRC connection setup signaling message to which the mobile wireless device 102 can respond with an RRC connection setup complete signaling message. The mobile wireless device 102 and the lower priority radio access subsystem 106 A can then exchange a number of signaling messages using the established RRC connection to register the mobile wireless device 102 with a wireless network through the lower priority radio access subsystem 106 A. After registration completes, the mobile wireless device 102 can be attached to the lower priority radio access subsystem 106 A in an idle state. The higher priority radio access subsystem 106 B can be still observable by the mobile wireless device 102, and based on re-selection criteria, the mobile wireless device 102 can re-select to the higher priority radio access subsystem 106B. The mobile wireless device 102 can then transmit an RRC connection request to the higher priority radio access subsystem 106 B to register with (and thereby complete re-selection to) the wireless network through the higher priority radio access subsystem 106 B. When an adverse network condition persists, the higher radio access subsystem 106 B can again respond negatively to the RRC connection request by sending an RRC connection reject signaling message to the mobile wireless device 102. The mobile wireless device 102 in response can then re-select back to the lower priority radio access subsystem 106 A and repeat the registration process. This cycle of reselection and registration between radio access subsystems 106 can repeat and can thereby cause excessive battery drain.

In a representative embodiment, the mobile wireless device 102 can attempt to camp on a strong RF 3G radio sector 104 that rejects the mobile wireless device 102. The mobile wireless device 102 can then camp on a lower priority 2G radio sector 104 but subsequently reselect to the strong RF 3G radio sector 104. The strong RF 3G radio sector 104 can again reject the mobile wireless device 102, and the cycle of rejection and reselection can repeat. As described further herein, the mobile wireless device 102 can recognize this scenario 1300 and can manage the signaling connections to reduce power consumption in the mobile wireless device 102.

The scenario 1300 illustrated in FIG. 13 in which the mobile wireless device 102 can re-select between two different radio sectors 104 of two different radio access subsystems 106 can be extended to multiple radio sectors 104. In a representative embodiment, the mobile wireless device 102 can attempt to "camp on" and register with a radio sector 104 having a higher priority or a stronger radio frequency signal. The higher priority or "stronger RF" radio sector 104 can reject the mobile wireless device 102, and the mobile wireless device 102 in turn can camp on and register with other radio sectors 104 that can have a lower priority and/or weaker radio frequency signals. The mobile wireless device 102 can prefer the higher priority and/or stronger RF signal radio sector 104, resulting in a cycle of reselection. In a representative embodiment, the mobile wireless device 102 can attempt to camp on a 3G radio sector having a poor RF signal. The mobile wireless device can reselect to another radio sector, such as a limited range/service type radio sector 104 having a strong RF signal (e.g. the mobile wireless device 102 can be within range of a "femto cell"). The limited range/service type radio sector 104 can reject the mobile wireless device 102, such as when the mobile wireless device 102 does not have permission to connect through the radio sector 104. In response to the rejection, the mobile wireless device 102 can reselect to and register with a lower priority 2G radio sector 104. While camped on the lower priority 2G radio sector 104, the mobile wireless device can later reselect to either the stronger signal 3G radio sector 104 or to the limited range/service type radio sector 104 and can again be rejected by either of the "preferred" radio sectors 104. This cycle of reselection and rejection can repeat causing a drain of battery resources in the mobile wireless device 102.

Figure 14:
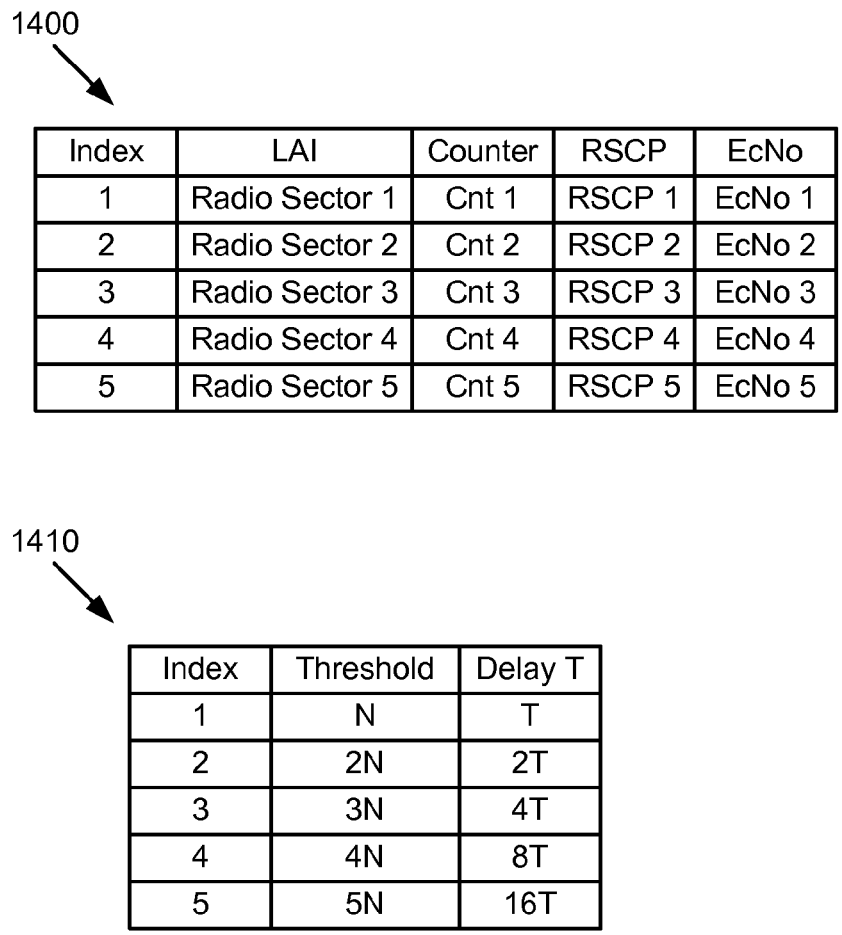
FIG. 14 illustrates a representative database array for a set of radio sectors (cells) and a representative database array for delays.

FIG. 14 illustrates two database arrays 1400/1410, which the mobile wireless device 102 can maintain internally, that can identify characteristics of radio sectors 104 from which negative responses or no responses have been received after the mobile wireless device 102 transmits signaling messages. Each radio sector 104 entry in a first database array 1400 can be indexed by a number that can be used to also retrieve information for the same radio sector 104. A radio sector 104 can be represented by a location area identifier (LAI). The radio sector 104 can be entered into the database 1400 when either receiving a negative response or no response to a transmitted signaling message. A counter in the database 1400 can be incremented each successive time that a negative response or no response is received from the radio sector 104. A radio sector 104 can be deleted from the database 1400 when a positive response is received to a transmitted signaling message.

In an embodiment, signal quality measurements, e.g. received signal code power (RSCP) and/or signal to noise/interference rations (EcNo) can be recorded and updated periodically for non-responsive radio sectors 104. Signal quality threshold values can be associated with each of the signal quality measurements. Counter values for a particular radio sector 104 can be used to determine a minimum time delay between successive transmitted signaling messages to the particular radio sector 104 by the mobile wireless device 102. A second database array 1410 can correlate time delay values with thresholds for the counter values. For a particular radio sector 104 (e.g. Radio Sector 2) having a particular counter value (e.g. Cnt 2) that does not exceed a threshold value N, the mobile wireless device 102 can ensure that at least T time units elapse between successively transmitted signaling messages to the same radio sector 104. When the particular count value is in the range from N+1 to 2N, the mobile wireless device 102 can increase the time delay between successively transmitted signaling messages to at least 2T time units. The table of entries in the database 1410 can be pre-configured or can be adjusted dynamically depending on observed network conditions.

In an embodiment, the mobile wireless device 102 can measure one or more current signal quality values, e.g. current RSCP and/or EcNo of a non-responsive radio sector, and can compare the current signal quality values to previously measured and stored signal quality values in the database 1400 for the particular non-responsive radio sector 104. When at least one (or both) of the current signal quality values exceeds previously stored signal quality values by at least an associated signal quality threshold value, the mobile wireless device 102 can transmit signaling messages to the non-responsive radio sector 104 without delay. Different signal quality metrics can be associated with different signal quality threshold values. In an embodiment, the signal quality threshold values can be pre-determined. When at least one (or both) of the current signal quality values do not exceed the previously stored signal quality values by at least the associated signal quality threshold values, the mobile wireless device 102 can be configured to delay a signaling message until at least a time delay indicated in the second database 1410 based on the counter value for the non-responsive radio sector 104 has elapsed since the last signaling message to the non-responsive radio sector 104 was transmitted.

Figure 15:
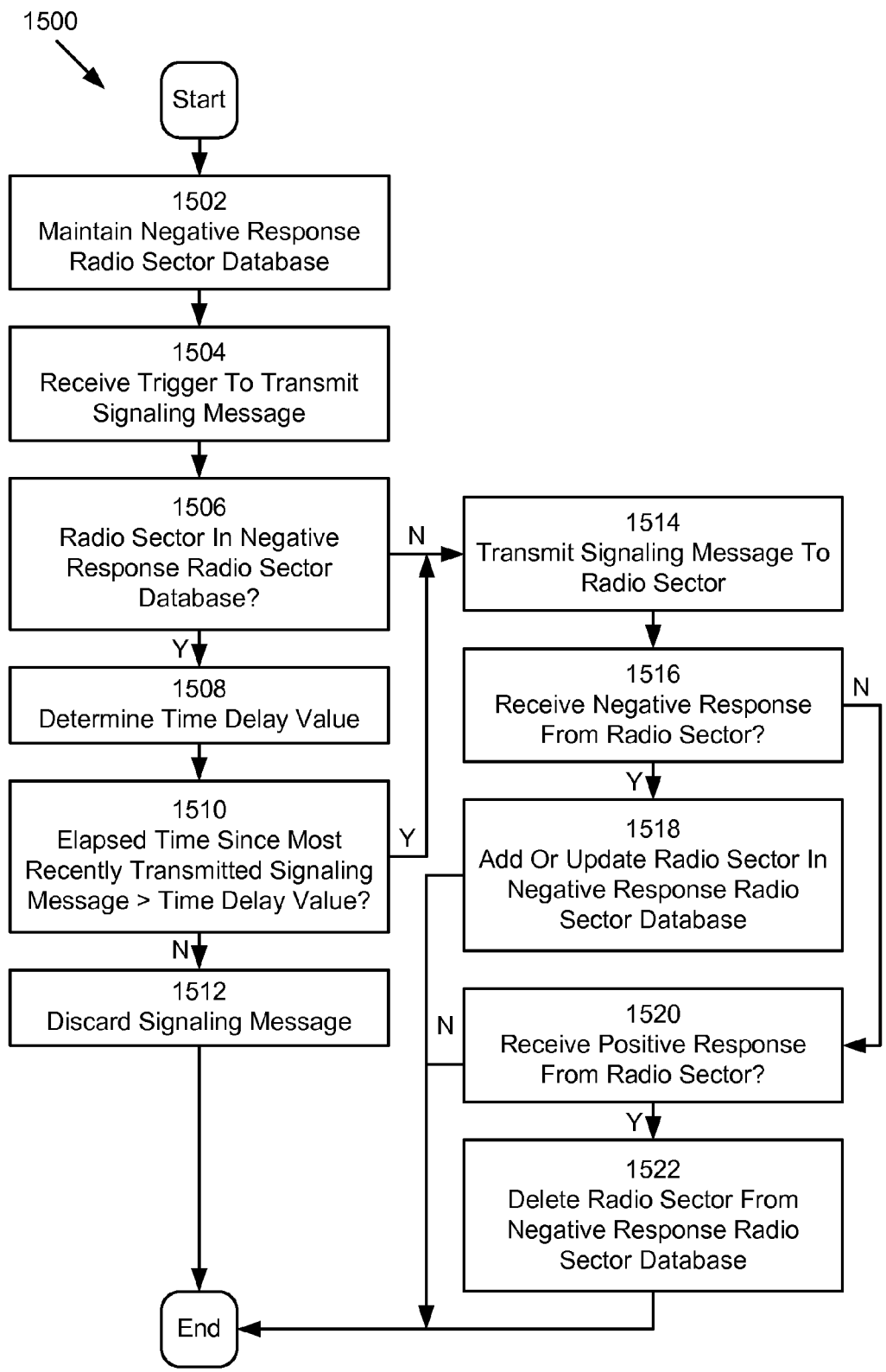
FIG. 15 illustrates a representative method to manage signaling messaging between the mobile wireless device and one or more rejecting radio sectors (cells) in the wireless network.

FIG. 15 illustrates a representative method 1500 for signaling connection management to conserve battery power in a mobile wireless device 102. In step 1502, the mobile wireless device 102 maintains a database 1400 of radio sectors 104 that send negative responses to signaling messages transmitted by the mobile wireless device 102. In step 1504, the mobile wireless device 102 receives a trigger to transmit a signaling message to a radio sector 104 in the wireless network 100. In step 1506, the mobile wireless device 102 determines whether the radio sector 104 is in the radio sector database 1400. When the radio sector 104 is in the radio sector database 1400, the mobile wireless device 102 determines a time delay value in step 1508. In an embodiment, the time delay value depends on a measured characteristic of the radio sector 104 (e.g. a count of negative or no responses to previously transmitted signaling messages). In step 1510, the mobile wireless device 102 compares an elapsed time since a most recently transmitted signaling message to the radio sector 104 to the determined time delay value. When the elapsed time does not exceed the time delay value, the signaling message discards the mobile wireless device 102 in step 1512. When the radio sector 104 is not in the negative response database 1400 or when the elapsed time exceeds the time delay value, the mobile wireless device in step 1514 transmits the signaling message to the radio sector 104. When the mobile wireless device 102 receives a negative response to the transmitted signaling message from the radio sector 104, in step 1518, one or more stored values for characteristics of the radio sector 104 are added to or updated in the negative response radio sector database 1400. When the mobile wireless device 102 receives a positive response from the radio sector 104, entries for the radio sector in the negative response sector database 1400 are deleted.

Figure 16:
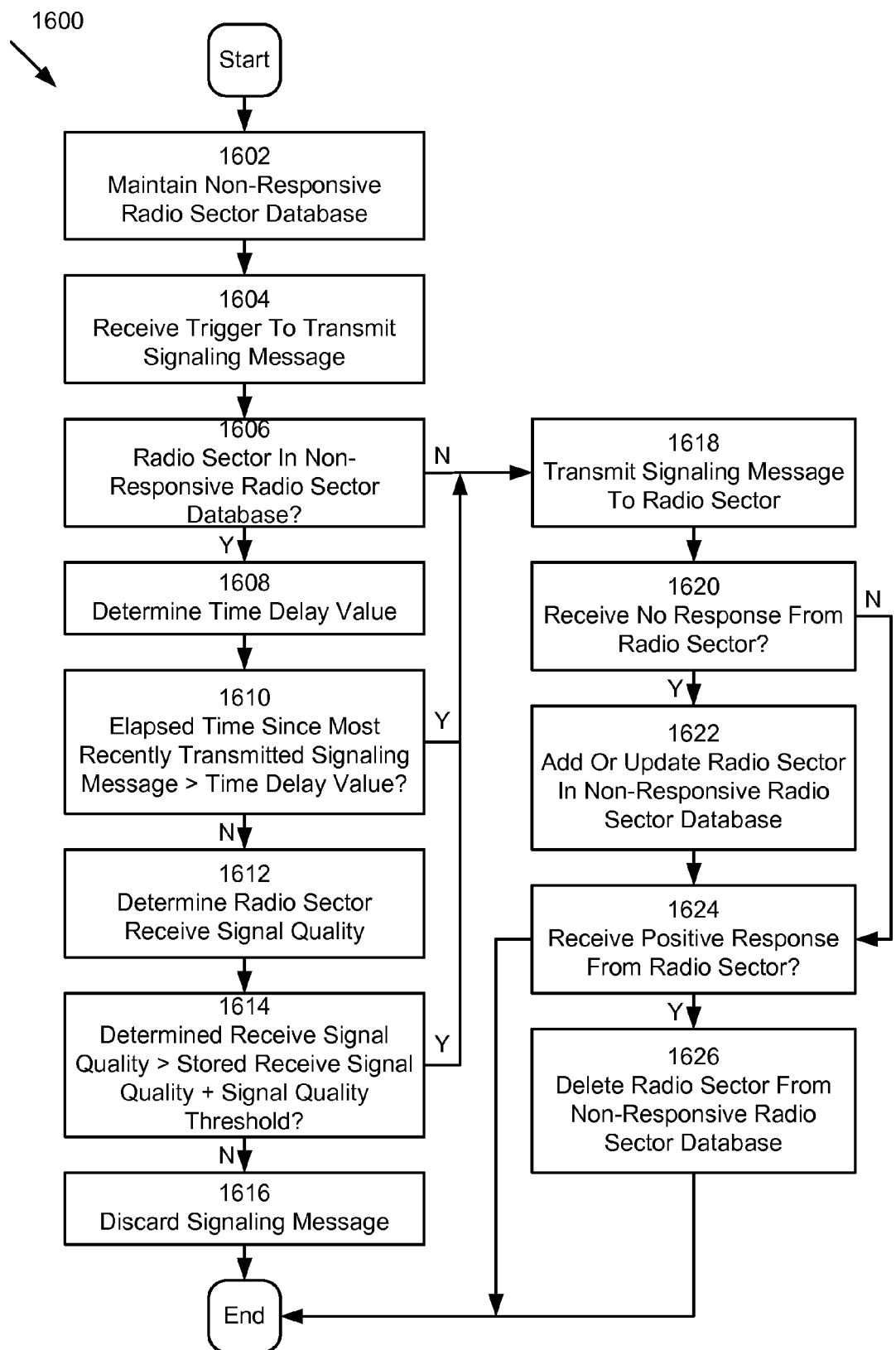
FIG. 16 illustrates a representative method to manage signaling messaging between the mobile wireless device and one or more non-responsive radio sectors (cells) in the wireless network.

FIG. 16 illustrates another representative method 1600 for signaling connection management in a mobile wireless device 102. In step 1602, the mobile wireless device maintains a database 1400 of non-responsive radio sectors 104. In step 1604, the mobile wireless device 102 receives a trigger to transmit a signaling message to a radio sector 104 in the wireless network 100. In step 1606, the mobile wireless device 102 determines whether the radio sector 104 is in the non-responsive radio sector database 1400. When the radio sector 104 is in the non-responsive radio sector database 1400, the mobile wireless device 102 determines a time delay value in step 1608. In step 1610, the mobile wireless device 102 compares an elapsed time since a most recently transmitted signaling message to the radio sector 104 to the determined time delay value. When the elapsed time does not exceed the time delay value, the mobile wireless device 102 in step 1612 determines a receive signal quality for the radio sector 104. In step 1614, the mobile wireless device compares the determined receive signal quality to a stored receive signal quality for the radio sector 104. When the determined receive signal quality does not exceed the stored receive signal quality for the radio sector 104 by at least an associated signal quality threshold value, the mobile wireless device 102 in step 1616 discards the signaling message. When the radio sector 104 is not in the non-responsive radio sector database 1400 or when the elapsed time exceeds the determined time delay value or when the determined receive signal quality exceeds the stored receive signal quality for the radio sector 104 by at least the associated signal quality threshold value, the mobile wireless device 102 transmits the signaling message to the radio sector 104 in step 1618. When no response is received from the radio sector 104 to the transmitting signaling message, the mobile wireless device 102 in step 1622 adds or updates entries for the radio sector 104 in the non-responsive radio sector database 1400. When a positive response is received from the radio sector 104 to the transmitted signaling message, the mobile wireless device 102 in step 1626 deletes entries for the radio sector from the non-responsive radio sector database 1400.

Figure 17:
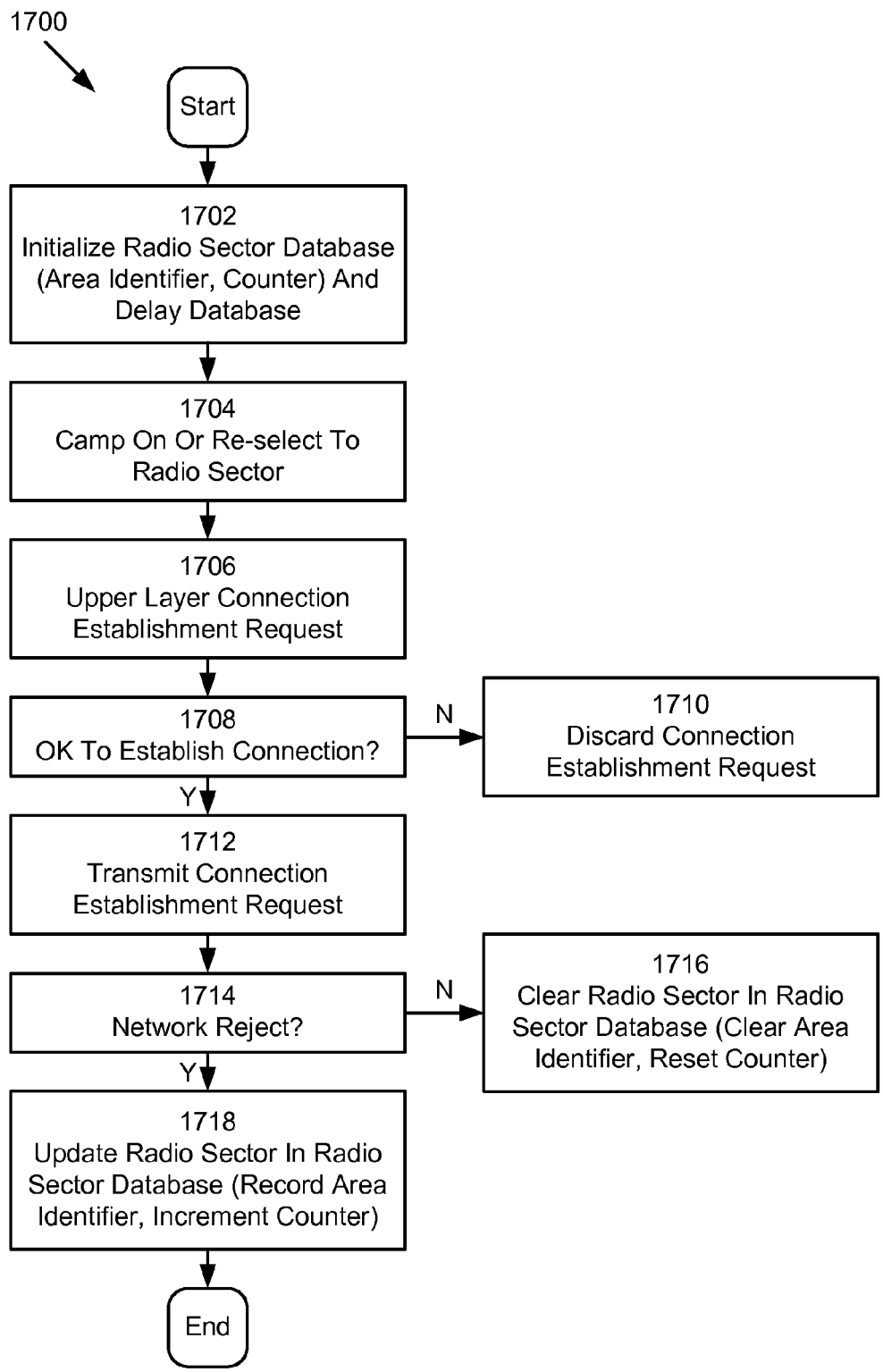
FIG. 17 illustrates another representative method to manage signaling messaging between the mobile wireless device and one or more rejecting radio sectors (cells) in the wireless network.

FIG. 17 illustrates another representative method 1700 to manage signaling connections between the mobile wireless device 102 and radio sectors 104 of the wireless network 100. In step 1702, the mobile wireless device initializes a radio sector database, including an area identifier and counter entry for each radio sector in the radio sector database. The mobile wireless device also initializes a delay database. In step 1704, the mobile wireless device camps on or reselects to a radio sector 104. In step 1706, the mobile wireless device 102 receives an upper layer request to establish a connection between the mobile wireless device 102 and the radio sector 104. In step 1708, the mobile wireless device 102 determines whether to establish the connection requested by the upper layer. The determination in step 1708 depends on one or more measured and/or observed properties of the radio sector 104. When the mobile wireless device 102 determines it is not OK to establish the requested connection, the mobile wireless device 102 discards the request to establish a connection with the radio sector 104. When the mobile wireless device 102 determines it is OK to establish the requested connection, then in step 1712, the mobile wireless device 102 transmits a connection establishment request to the radio sector 104 in the wireless network 100. When receiving a rejection from the radio sector 104 in the wireless network, in step 1714, the mobile wireless device subsequently updates entries for the radio sector in the radio sector database 1400. In an embodiment, the mobile wireless device 102 records an area identifier of the radio sector 104 and increments a failure counter in the radio sector database. When the mobile wireless device 102 does not receive a rejection from the radio sector 104 to the transmitted connection request, the mobile wireless device 102 in step 1716 clears entries for the radio sector 104 in the radio sector database 1400. In an embodiment, the area identifier is cleared and failure counters are reset.

Figure 18:
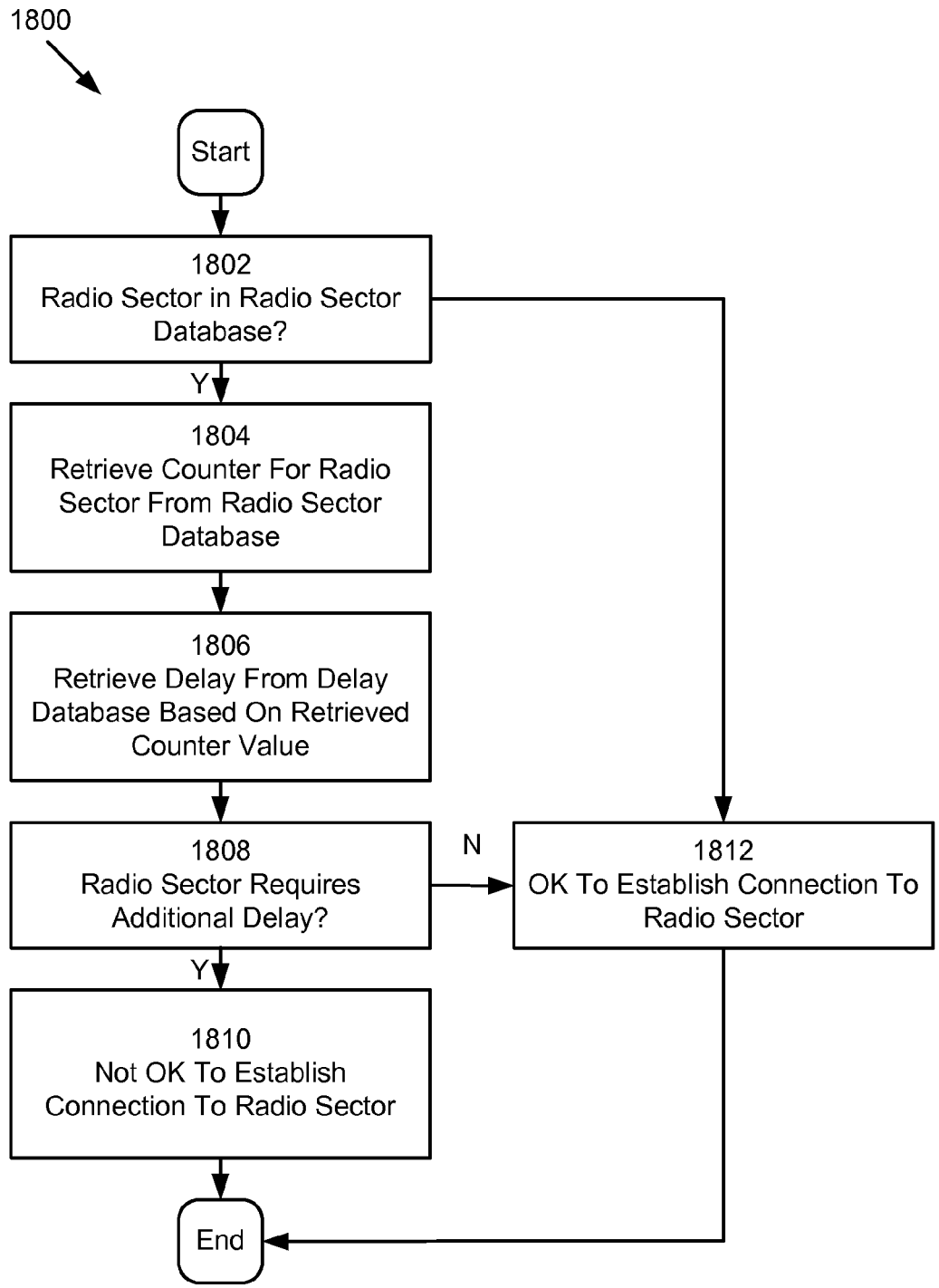
FIG. 18 illustrates a set of steps to determine whether to establish connections between the wireless mobile device and the wireless network.

FIG. 18 illustrates steps for a method 1800 to determine whether it is OK for the mobile wireless device 102 to establish a connection to the radio sector 104 in the wireless network 100 in response to a request to establish a connection. In step 1802, the mobile wireless device 102 determines whether the radio sector 104 is in the radio sector database 1400. When the radio sector 104 is not in the radio sector database 1400, then in step 1812, the mobile wireless device 102 determines it is OK to establish a requested connection to the radio sector 104. When the radio sector 104 is in the radio sector database 1400, the mobile wireless device 102 retrieves a counter for the radio sector 104 from the radio sector database 1400. In step 1806, the mobile wireless device 102 retrieves a delay from the delay database 1410 based on the retrieved counter value. In step 1808, the mobile wireless device 102 determines whether the radio sector 104 requires additional delay to establish the connection based on the retrieved delay value. When no additional delay is required, the mobile wireless device 102 determines it is OK to establish a connection with the radio sector 104. When additional delay is required, the mobile wireless device determines in step 1810 it is not OK to establish a connection to the radio sector 104. In an embodiment, the requirement for additional delay depends on an elapsed time since a previous request to establish a connection was sent to the radio sector 104.

Figure 19:
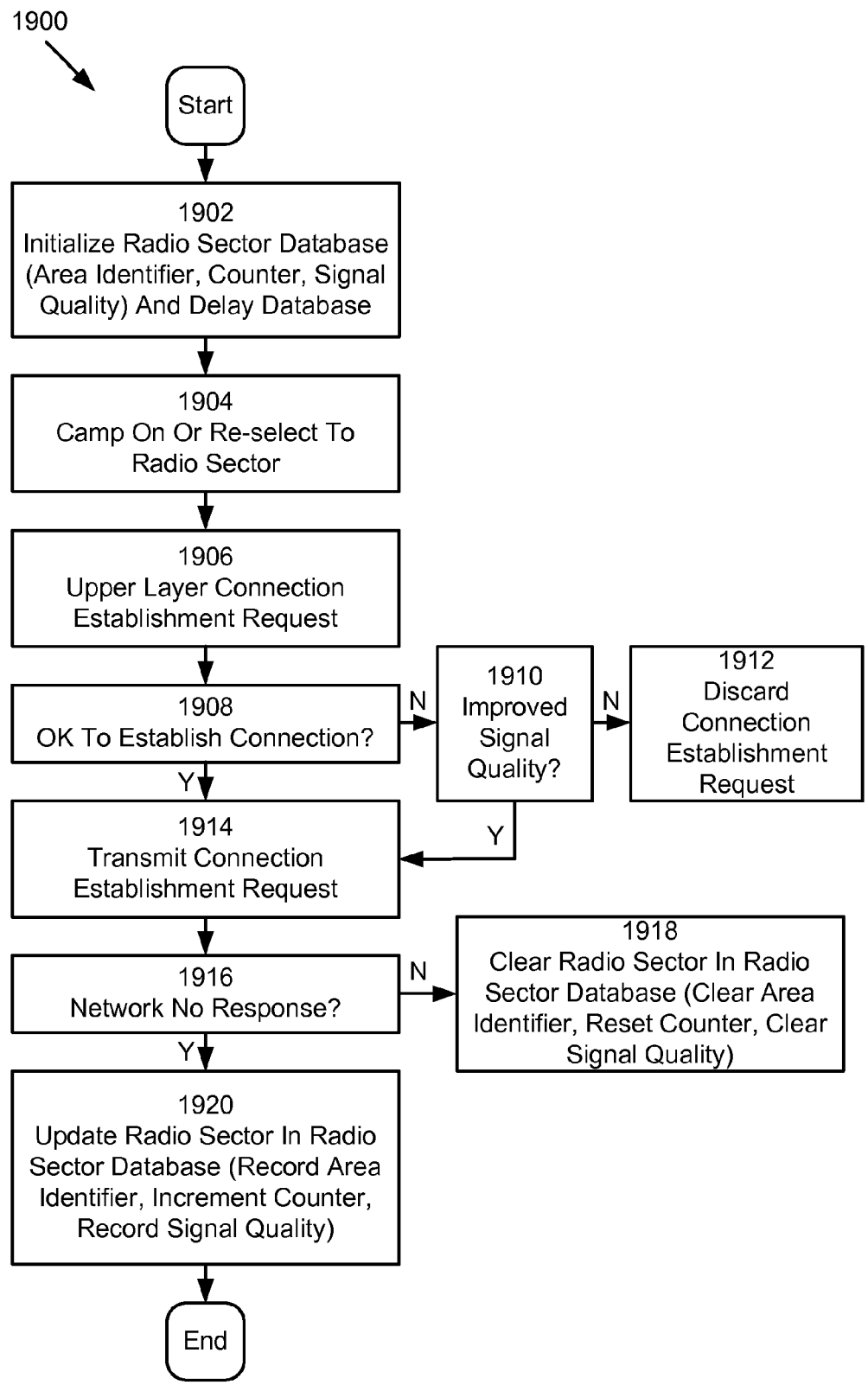
FIG. 19 illustrates another representative method to manage signaling messaging between the mobile wireless device and one or more non-responsive radio sectors in the wireless network.

FIG. 19 illustrates steps of another method 1900 to manage signaling connections between the mobile wireless device 102 and radio sectors 104 in the wireless network 100. In step 1902, the mobile wireless device initializes a radio sector database 1400 that includes an area identifier, a counter and at least one signal quality for each radio sector 104 in the radio sector database 1400. The mobile wireless device 102 also initializes a delay database 1410. In step 1904, the mobile wireless device 102 camps on or reselects to a radio sector 104. In step 1906, the mobile wireless device 102 receives a request from an upper layer to establish a connection with the radio sector 104. In step 1908, the mobile wireless device 102 determines whether it is OK to establish a connection with the radio sector 104. When it is determined to be OK to establish a connection with the radio sector 104, the mobile wireless device 102 in step 1914 transmits a request to establish a connection with the radio sector 104. When no response is received from the radio sector 104 in step 1916, the mobile wireless device updates entries for the radio sector 104 in the radio sector database 1400 including recording the area identifier, incrementing the counter value and recording at least one signal quality value for the radio sector 104. When a response is received from the radio sector, the mobile wireless device 102 in step 1918 clears entries for the radio sector 104 in the radio sector database 1400 including clearing the area identifier, resetting the counter value and clearing the at least one signal quality value. When the mobile wireless device 102 determines it is not OK to establish a signaling connection, in step 1910, the mobile wireless device determines if at least one signal quality metric for the radio sector 104 has improved. In an embodiment, the improvement in the at least one signal quality metric can be required to be greater than an associated signal quality threshold value. When signal quality for the radio sector 104 has not improved, the request to establish a signaling connection is discarded in step 1912. When signal quality has improved, the request to establish a signaling connection with the radio sector 104 is transmitted.

The various aspects, embodiments, implementations or features of the described embodiments can be used separately or in any combination. Various aspects of the described embodiments can be implemented by software, hardware or a combination of hardware and software. The described embodiments can also be embodied as computer program product encoded in a non-transitory computer readable medium. The non-transitory computer readable medium is any data storage device that can store data which can thereafter be read by a computer system. Examples of the non-transitory computer readable medium include read-only memory, random-access memory, CD-ROMs, DVDs, magnetic tape and optical data storage devices. The non-transitory computer readable medium can also be distributed over network-coupled computer systems so that the computer program product is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method to conserve battery power at a mobile wireless device by managing signaling connections between the mobile wireless device and a wireless network, the method comprising:
    at the mobile wireless device:
        maintaining a radio sector database identifying radio sectors from which the mobile wireless device has received at least one negative response message or no response message, in response to at least one transmitted signaling message from the mobile wireless device, wherein the radio sector database comprises a failure count value for each radio sector identified within the radio sector database;

receiving a trigger to transmit a signaling message to a target radio sector in the wireless network;

in response to determining that the target radio sector is identified within the radio sector database maintained at the mobile wireless device:
  determining a time delay value associated with the target radio sector and an elapsed time since a most recently transmitted signaling message of the mobile wireless device, wherein the determined time delay value corresponds to a failure count value for the target radio sector; and
  comparing the elapsed time since the most recently transmitted signaling message to the determined time delay value,
  wherein the signaling message is not transmitted to the target radio sector when the elapsed time since the most recently transmitted signaling message does not exceed the determined time delay value associated with the target radio sector; and in response to determining that the target radio sector is not identified within the radio sector database maintained at the mobile wireless device:
  transmitting the signaling message to the target radio sector; and
  adding an indication of the target radio sector to the radio sector database maintained at the mobile wireless device when a negative response message or no response message is received from the target radio sector via the wireless network, in response to the transmitted signaling message.

2. The method as recited in claim 1, wherein the failure count value is a number of failed connections with a radio sector to which the mobile wireless device is unable to establish a connection.

3. The method as recited in claim 1, further comprising transmitting the signaling message to the target radio sector when an indication of the target radio sector is in the radio sector database maintained at the mobile wireless device and the elapsed time since the most recently transmitted signaling message exceeds the determined time delay value associated with the target radio sector.

4. The method as recited in claim 3, further comprising deleting an indication of the target radio sector from the radio sector database maintained at the mobile wireless device when a positive response message is received from the target radio sector, in response to the transmitted signaling message.

5. The method as recited in claim 2, further comprising incrementing the failure count value associated with the target radio sector in the radio sector database maintained at the mobile wireless device when a negative response message or no response message is received from the target radio sector, in response to the transmitted signaling message.

6. The method as recited in claim 1, wherein the radio sector database maintained at the mobile wireless device includes at least one signal quality metric for each radio sector stored in the radio sector database, including the target radio sector, and the method further comprises storing a most recent value for at least one signal quality metric associated with the target radio sector when adding information associated with the target radio sector to the radio sector database or when updating information associated with the target radio sector in the radio sector database.

7. The method as recited in claim 6, further comprising:
determining a current value of the at least one signal quality metric associated with the target radio sector in the radio sector database; and
transmitting the signaling message to the wireless network irrespective of the determined time delay value associated with the target radio sector when the determined current value of the at least one signal quality metric exceeds the stored most recent value for the at least one signal quality metric associated with the target radio sector by at least a signal quality threshold value.

8. The method as recited in claim 1, wherein the trigger to transmit the signaling message to the target radio sector is at least one of a location area update, a routing area update, or a tracking area update.

9. A mobile wireless device configured to communicate via a wireless network, the mobile wireless device comprising:
one or more processors;
at least one transceiver that is configurable to communicate with one or more radio sectors via the wireless network; and
a radio sector database identifying problematic radio sectors from which the mobile wireless device has received a negative response message or no response message, in response to a connection request, wherein the radio sector database comprises a connection request failure count value for each radio sector identified within the radio sector database, and
wherein the one or more processors are operable to cause the mobile wireless device to:
  generate a request to establish a radio connection with a target radio sector of the wireless network;
  consult the radio sector database to determine whether to establish the radio connection with the target radio sector
  in response to determining that the target radio sector is identified within the radio sector database:
    determine a time delay value associated with the target radio sector, wherein the determined time delay value corresponds to a connection request failure count value for the target radio sector;
    compare an elapsed time since transmitting a most recent request to establish a radio connection with the target radio sector to the determined time delay value; and
    discard the request to establish the radio connection with the target radio sector when the elapsed time since transmitting a most recent request to establish a radio connection with the target radio sector is less than the determined time delay value; and
  in response to determining that the target radio sector is not identified within the radio sector database, transmit the request to establish the radio connection with the target radio sector via the wireless network.

10. The mobile wireless device as recited in claim 9, wherein the one or more processors are further operable to cause the mobile wireless device to add an indication of the target radio sector to the radio sector database when a radio resource reject message is received from the target radio sector, in response to the transmitted request to establish the radio connection with the target radio sector.

11. The mobile wireless device as recited in claim 10, wherein the one or more processors are further operable to cause the mobile wireless device to increment the connection request failure count for the target radio sector in the radio sector database when a radio resource reject message is received from the target radio sector, in response to the transmitted request to establish the radio connection with the target radio sector.

12. The mobile wireless device as recited in claim 9, wherein an indication of each radio sector in the radio sector database comprises at least one of a location area identifier, a routing area identifier, or a tracking area identifier.

13. The mobile wireless device as recited in claim 9, wherein the one or more processors are further operable to cause the mobile wireless device to delete an indication of the target radio sector from the radio sector database when a radio resource setup message is received from the target radio sector, in response to the transmitted request to establish the radio connection with the target radio sector.

14. The mobile wireless device as recited in claim 9, wherein the one or more processors are further operable to cause the mobile wireless device to determine the time delay value associated with the target radio sector based at least in part on the connection request failure count associated with the target radio sector.

15. A mobile wireless device configured to communicate via a wireless network, the mobile wireless device comprising:
one or more processors;
at least one transceiver that is configurable to communicate with one or more radio sectors via the wireless network; and
a radio sector database identifying problematic radio sectors from which the mobile wireless device has received a negative response message or no response message, in response to a connection request, wherein the radio sector database comprises a connection request failure count for each radio sector identified within the radio sector database, and
wherein the one or more processors are operable to cause the mobile wireless device to:
generate a request to establish a radio connection with a target radio sector via the wireless network;
consult the radio sector database to determine whether to establish the radio connection with the target radio sector, wherein at least one signal quality metric is stored in the radio sector database maintained at the mobile wireless device for each radio sector in the radio sector database; and
in response to determining that the target radio sector is identified within the radio sector database:
determine a current value of at least one signal quality metric associated with the target radio sector;
determine a time delay value associated with the target radio sector, wherein the time delay value corresponds to a connection request failure count value for the target radio sector;
compare an elapsed time since transmitting a most recent request to establish a radio connection with the target radio sector via the wireless network to the determined time delay value; and
discard the request to establish the radio connection with the target radio sector when:
i. the current value of the at least one signal quality metric associated with the target radio sector does not exceed a stored value of at least one signal quality metric associated with the target radio sector by at least a signal quality threshold value, and
ii. the elapsed time since transmitting a most recent request to establish a radio connection with the target radio sector is less than the determined time delay value.

16. The mobile wireless device as recited in claim 15, wherein the one or more processors are further operable to cause the mobile wireless device to add an indication of the target radio sector to the radio sector database when the target radio sector is not identified within the radio sector database and no response message is received from the target radio sector via the wireless network, in response to a transmitted request to establish the radio connection with the target radio sector.

17. The mobile wireless device as recited in claim 15, wherein the one or more processors are further operable to cause the mobile wireless device to:
maintain the connection request failure count for each radio sector in the radio sector database; and
increment a connection request failure count for the target radio sector when no response message is received from the target radio sector via wireless network, in response to a transmitted request to establish the radio connection with the target radio sector.

18. The mobile wireless device as recited in claim 15, wherein each indication of a radio sector within the radio sector database comprises at least one of a location area identifier, a routing area identifier, or a tracking area identifier.

19. The mobile wireless device as recited in claim 15, wherein the one or more processors are further operable to cause the mobile wireless device to delete an indication of the target radio sector from the radio sector database when a radio resource setup message is received from the target radio sector via the wireless network, in response to a transmitted request to establish the radio connection with the target radio sector.

20. A non-transitory computer-readable medium having instructions stored thereon that, when executed at a mobile wireless device, causes the mobile wireless device to perform a method comprising:
maintaining a radio sector database of radio sectors from which the mobile wireless device has received at least one negative response message or no response message, in response to at least one transmitted request message from the mobile wireless device;
maintaining a time delay database of time delay values associated with one or more failure count threshold values, wherein each of the one or more failure count threshold values is associated with a number of failed access attempts for a radio sector with which the mobile wireless device is unable to establish communications;
receiving a request to establish a radio connection between the mobile wireless device and a target radio sector via a wireless network;
determining whether to establish the radio connection with the target radio sector based at least in part on one or more radio sector properties associated with the target radio sector, wherein the one or more radio sector properties associated with the target radio sector are stored in the radio sector database or in the time delay database, and based at least in part on a comparison of an elapsed time since a most recent request to a establish a radio connection with the target radio sector to a time delay value associated with the target radio sector;
in response to determining not to establish the radio connection with the target radio sector, discarding the request at the mobile wireless device; and
in response to determining to establish the radio connection with the target radio sector:

transmitting the request to the target radio sector;

adding an indication of the target radio sector to the radio sector database and updating the one or more radio sector properties associated with the target radio sector stored in the radio sector database or the time delay database when a negative response message or when no response message is received from the target radio sector via the wireless network, in response to the transmitted request; and removing an indication of the target radio sector from the radio sector database when a response message is received from the target radio sector via wireless network, in response to the transmitted request.

21. The non-transitory computer-readable medium as recited in claim 20, wherein the one or more radio sector properties associated with the target radio sector comprise at least one of a local area identifier, a failure count value, or a signal quality metric.

22. The non-transitory computer-readable medium as recited in claim 20, wherein updating the one or more radio sector properties associated with the target radio sector comprises incrementing a failure count value associated with the target radio sector.

23. The non-transitory computer-readable medium as recited in claim 20, wherein removing the indication of the target radio sector from the radio sector database maintained at the mobile wireless device comprises at least one of clearing a local area identifier associated with the target radio sector from the radio sector database, clearing a signal quality metric associated with the target radio sector from the radio sector database, or resetting a failure count value associated with the target radio sector within the radio sector database.

24. The non-transitory computer-readable medium as recited in claim 20, wherein determining whether to establish the radio connection with the target radio sector further comprises:

retrieving a failure count value associated with the target radio sector from the radio sector database maintained at the mobile wireless device;

determining a time delay value from information stored in the time delay database based at least in part on comparing the retrieved failure counter count value to a corresponding failure count threshold value in the time delay database; and determining not to establish the radio connection between the mobile wireless device and the target radio sector when a time elapsed since a most recently transmitted request is less than the determined time delay value.

25. The non-transitory computer-readable medium as recited in claim 24, wherein the method further comprises:

measuring a current signal quality value associated with the target radio sector;

retrieving a stored signal quality value associated with the target radio sector from the radio sector database; and determining to establish the radio connection between the mobile wireless device and the target radio sector when the measured current signal quality value associated with the target radio sector exceeds the stored signal quality value associated with the target radio sector by at least a signal quality threshold value.

* * * * *